(12) United States Patent
Zhou et al.

(10) Patent No.: US 9,248,707 B2
(45) Date of Patent: Feb. 2, 2016

(54) INTELLIGENT TIRE INFLATION AND DEFLATION SYSTEM APPARATUS

(71) Applicants: Joe Huayue Zhou, Hacienda Heights, CA (US); Steven Hiuman Wong, Cerritos, CA (US)

(72) Inventors: Joe Huayue Zhou, Hacienda Heights, CA (US); Steven Hiuman Wong, Cerritos, CA (US)

( * ) Notice: Subject to any disclaimer, the term of this patent is extended or adjusted under 35 U.S.C. 154(b) by 120 days.

(21) Appl. No.: 14/140,505

(22) Filed: Dec. 25, 2013

(65) Prior Publication Data

US 2015/0174972 A1   Jun. 25, 2015

(51) Int. Cl.
*B60C 23/00* (2006.01)
*B60C 23/04* (2006.01)
*G01C 22/02* (2006.01)

(52) U.S. Cl.
CPC ........... *B60C 23/003* (2013.01); *B60C 23/0467* (2013.01); *G01C 22/02* (2013.01)

(58) Field of Classification Search
CPC .... B60C 23/001; B60C 23/004; B60C 23/10; B60C 23/12
USPC .......... 340/447, 444, 445, 442; 152/415, 418, 152/419, 423, 424, 425
See application file for complete search history.

(56) References Cited

U.S. PATENT DOCUMENTS

2012/0285596 A1*  11/2012  Hrabal ................... B60C 23/12
                                                                  152/450

* cited by examiner

*Primary Examiner* — Daryl Pope

(57) ABSTRACT

An intelligent tire pressure management system capable of real-time tire pressure monitoring, vehicle load detection, and automatic tire inflation and deflation for maintaining optimal tire pressure in a commercial vehicle. Additional functions include counting tire rotations for calculating and recording distance travelled for each tire, and detecting wheel sliding due to locked-up tires. The system includes a chassis-mounted control box connecting to the vehicle air supply, a hubcap-mounted dual wheel valve apparatus integrated with a rotary union assembly that connects through the vehicle hollowed axles to the air tubes from the control box. The inflation/deflation supporting dual wheel valve apparatus has an embedded electronic unit that monitors individual tire pressure and temperature in real time, and communicates with the control box over the power line. Furthermore a load sensor integrated with the control box provides the system with the current vehicle load information. With readily available real time tire pressure data and current vehicle load information, this system can intelligently adjusts tire pressure to the desired level when necessary and, as a result, prolongs tire life, improves fuel economy, reduces the vehicle maintenance costs, and promptly alerts the driver of low, leaky or flat tire conditions for enabling the driver to take immediate corrective actions.

13 Claims, 17 Drawing Sheets

INTELLIGENT TIRE INFLATION AND DEFLATION SYSTEM APPARATUS

FIELD OF THE INVENTION

The present invention relates to tire pressure management systems with real time pressure monitoring and automatic pressure inflation and deflation functionalities. Particularly, the invention relates to an apparatus intelligently maintaining optimized tire pressure with respect to pressure variations, road conditions, and vehicle load conditions while the vehicle is in motion, plus the counting of tire rotations for measurement of distance traveled and detection of locked wheel situations.

BACKGROUND OF THE INVENTION

Keeping proper tire pressure is a very important aspect of vehicle maintenance. Driving on underinflated or overinflated tires compromises stopping distance, ride and handling, fuel economy, tread wear, and load bearing. Overinflation decreases traction, causes the tread to wear more quickly in the center, and wear suspension components faster. Underinflated tires have greater flex in the tires' sidewalls. Excessive deflection causes wear closer to the sides, leads to more heat buildup that speeding wear, and greatly reduces fuel economy. Each tire is rated to carry a maximum amount of weight at a prescribed tire pressure. When there is insufficient air pressure in a tire to support a specific load, the extra heat generated in the tire can cause it to fail. Properly inflated pressure during vehicle operation can achieve optimal tire deflection for the best grip and will help to provide even wear and longer life of the expensive tires with substantially improved fuel economy. The concept of a tire inflation system has been implemented on commercial and military vehicles for many years. Many military vehicles are equipped with a central tire inflation system (CTIS) which incorporates both inflation and deflation features, allowing the pressure of the tire to be manually adjusted in response to the road conditions experienced by a vehicle. For example, on relatively soft terrain, the tires could be deflated somewhat to improve traction. In contrast, on harder surfaces, such as paved roads, the tires could be more highly pressurized. Nevertheless, currently available central tire inflation systems do not have real time tire pressure monitor capabilities nor able to intelligently and automatically manage tire pressure with respect to pressure variation, vehicle load and terrain conditions. For commercial vehicles, current tire inflation systems are designed to inflate tire pressure only. Their primary function is to ensure that tire pressure does not fall below a preset tire pressure. Without deflation capability, such systems often can only maintain a preset pressure when the tires were cold but unable to adjust the pressure when the tires got hot and might become overly inflated. Furthermore, one of the most important variables affecting the ideal amount of tire pressure is the load the vehicle tires need to carry but inflation-only system is unable to adjust the tire pressure in accordance to the vehicle load.

U.S. Pat. No. 6,145,559 issued to Rupert Henry Ingram on Nov. 14, 2000 discloses automated tire inflation by using a rotary union to connect a rotary axle and hub assembly. The assembly includes a rotary air connection assembly thread-ably mounted on the hubcap.

U.S. Pat. No. 6,585,019 B1 issued to Anthony L. Ingram on Jul. 1, 2003 discloses a rotary union assembly for use in an automatic tire inflation system for maintaining the desired pressure in the tires on a trailer or other vehicle having pressurized axles. The assembly communicates the valve stems on a pair of adjacent tires with the axle interior through the use of a flexible tube extending between a stationary first fitting thread-ably engaged in the axle spindle and a rotary housing secured against the outside end surface of the hubcap so as to be positioned exteriorly of wheel lubrication compartment and rotatable with the hubcap.

U.S. Patent US 2004/01732296 A1 issued to Jay D. White on Sep. 9, 2004 discloses a tire inflation system include an air supply in selective fluid communication with a tire via a pneumatic conduit. An inflation pressure of the tire is measured with a set-up procedure and the tire is inflated with an extended-pulse procedure.

U.S. Patent US 2006/0018766 A1 issued to Edmund A. Stanczak on Jan. 26, 2006 discloses a tire inflation system includes a hose that connects to a tire via a valve stem. A control valve is in fluid communication with the hose and senses when pressure falls below a predetermined minimum value. When this occurs, the control valve automatically opens to re-supply air to the tire until the predetermined minimum value is achieved.

U.S. Pat. No. 6,144,295 is issued to Brian Adams on Nov. 7, 2000 discloses a central tire inflation system for a work vehicle. The central tire inflation system controls the inflation pressure in the tires of a work vehicle. The central tire inflation system may be placed in an automatic or manual mode. In the automatic mode, the system make changes to the tire pressures according to the tire parameters, terrain conditions, and the operating loads placed on the tire.

U.S. Patent US 2007/0204946 A1 is issued to Martin A. Medley on Sep. 6, 2007 discloses a central tire inflation wheel assembly and valve. The valve includes a main body that is position-able in a sealed and recessed or embedded configuration within the aperture in the wheel rim in communication with the interior of the tire and with a pressurized air source that is used to inflate or deflate the tire.

Typically, these commercial tire inflation systems teach how to inflate air into tires through a rotary union with a one-way check valve that does not have tire deflation functionality. Such system mostly must operate continuously or periodically without knowing current tire pressure in individual tires. When inflation is not activated such systems are unable to detect any flat or leaky tire conditions. While military central tire inflation systems can perform tire pressure inflation and deflation functions, in order to avoid over burning the hub seal, these systems mostly can only check tire pressure during the periodic inflation and deflation activation time. Moreover, these teachings do not address nor provide intelligent tire management solutions to resolve many practical issues, as described below:

(i) Tire Inflation and Deflation with Real Time Monitoring

Properly pressurizing and monitoring tires in real time are utmost important for driving safety and for prolonging the life of tires. However prior commercial tire inflation systems only inflate tires and do not monitor individual tire pressure. It is technically challenging to monitor each tire pressure in real time for tire inflation systems. Currently there are no commercially available tire inflation systems incorporating embedded electronic unit into each wheel valve assembly for monitoring individual tire pressure, and inflate or deflate the tires only when tire pressure is deviate from a predetermined optimal level. Prior teachings generally do not present practical methods to combine real time tire pressure monitor with tire inflation and deflation for commercial vehicle applications.

(ii) Intelligent Tire Pressure Management.

There are many tire inflating systems available on the market and most of them are designed for trailer installation. Such systems mostly use compressed air from the vehicle air tank to inflate tires when tire pressure fell below a preset level. Air from the existing trailer air supply is routed to a control box and then fed into air tubes installed inside each hollowed trailer axle. The air tubes run through the axles to carry air through a rotary union assembly joined at the end of the wheel spindle in order to distribute air to each tire via the valve stem. Generally tire inflation systems do not support intelligent tire pressure management, must inflate the tires continuously or periodically for every trip, and often overly inflate the tires.

Existing tire inflation systems generally use an in-line flow sensor to monitor air flow and do not have direct pressure readings from the tires for controlling the inflation, therefore such systems typically do not know if preset pressure was maintained in the tires. Mostly such systems would deduce that there might be leaky or flat tires if overall pressure was still low after inflating a period of time. This indirect detection of air leak and flat tire is unreliable and usually belated. With frequent system operation, the excessive work load putting on the rotary hub seal unit and the air compressor will wear out the parts sooner and would lead to more expensive vehicle maintenance and even unsafe driving conditions. A tire inflation and deflation system integrated with real tire pressure monitor manages pressure intelligently based on real-time tire pressure data and vehicle load, adjusts tire pressure only when necessary and, as a result, works less and thereby reduces the vehicle maintenance costs. More importantly such an intelligent system improves vehicle safety for it would be able to promptly alert the driver low, leaky or flat tire conditions and enabling the driver to take immediate corrective actions.

SUMMARY OF THE INVENTION

A main object of the present invention is to provide an intelligent tire pressure management system with automatic and manual tire pressure inflation and deflation functionalities for commercial vehicles. Such a system is capable of keeping tires of an operating vehicle in a used-defined optimal pressure level in accordance to real-time tire pressure vehicle load and terrain conditions. A special wheel valve with embedded pressure monitoring electronic unit for each tire that works with a chassis mounting central control box provide the controlling features for intelligent tire pressure management. For dual tires, two wheel valves are incorporated into a hubcap mounting apparatus with a built-in rotary union to support inflating and deflating each dual tire pressure in real time.

Another object of the invention is integrating load sensors into the intelligent tire management system for monitoring vehicle load and, accordingly, inflating or deflating the tire pressure to the user defined or tire manufactory recommended ideal pressure. Current vehicle load information provided by the system enables the driver to readily determine if the load being transported is consistent with the vehicle limitations and whether vehicle weight regulations are met. Beneficially, the vehicle operator no longer needs to spend the time and expense at weigh stations.

Another object of the invention is a method for electronically detecting and counting each set of wheel's rotation and sending the count back to the central control unit for detecting wheel sliding caused by locked up wheels, and for calculating tire distance traveled and thereby facilitating regular tire maintenance. In addition, this method supports calculating tire speed for the system to control pressure settings in accordance to terrain condition.

Another object of the invention is a method for system communication and power supply to the wheel valve electronic unit by using a single wire connecting the central control unit and the hubcap mounting rotary wheel valve. System with battery-less electronic assembly and power line communication is more reliable and needs less maintenance.

Another object of the invention is to provide a central control unit with electronic circuitry, built-in keypad, LCD display, control valves and manifold for collecting tire pressure and temperature readings, measuring vehicle load, recording wheel rotation count, controlling tire inflation and deflation, and communicating tire management information through the power line. The central control unit is the brain of the intelligent tire management system.

DETAILED DESCRIPTION OF THE INVENTION

An embodiment of the invention is described herein with references to the figures using reference designations as shown in the figures.

Figure 1A:
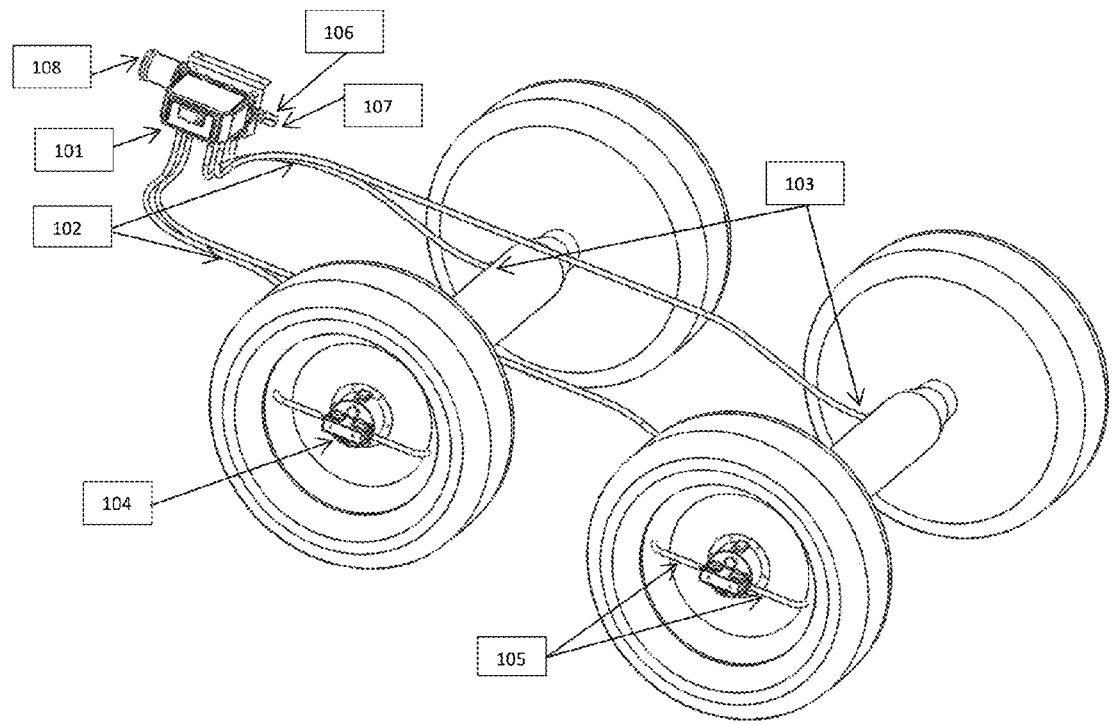
FIGS. 1a & 1b are drawings showing intelligent tire management system installed on respective 2-axle and 3-axle trailer axles.
Figure 1B:
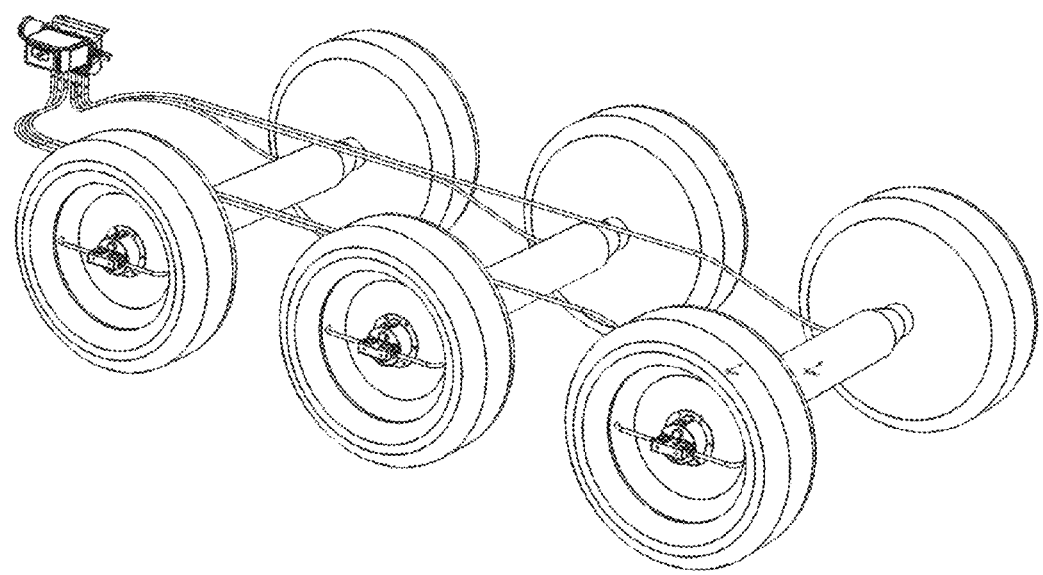

FIG. 1a is a drawing of the intelligent tire management system installing on a trailer chassis with two hollowed axles, where 101 is an electronic manifold controller for automatically controlling air inflation and deflation to all the tires. The electronic manifold controller gets pressurized air supply for inflation through air inlet 107 coming from the vehicle air compressor and releases air to the atmosphere for deflation through air outlet 108. The electronic manifold controller also has multiple air outlets with each outlet communicating to a tire or a dual tire set through tubing 102 that laid along the vehicle chassis and then inserted into openings 103 on the hollowed axle and passed through the cavity inside the axle, eventually connecting to hubcap mounted rotary wheel valve unit 104, which has air outlets connecting through hoses 105 to individual tire valve stems. The Rotary wheel valve unit 104 can open and close the air flow for tire inflation/deflation via its built-in wheel valves that are pneumatically controllable by the electronic manifold controller. Air inlet 106 gets pressurized air input from the vehicle suspension air springs for the electronic manifold controller to monitor pressure variation caused by changes in vehicle load, thereby enabling the system to adjust vehicle tire pressure for achieving the optimal tire deflection. FIG. 1*b* shows a drawing with the intelligent tire management system being installed on a 3-axle trailer with hollowed axles.

Figure 2A:
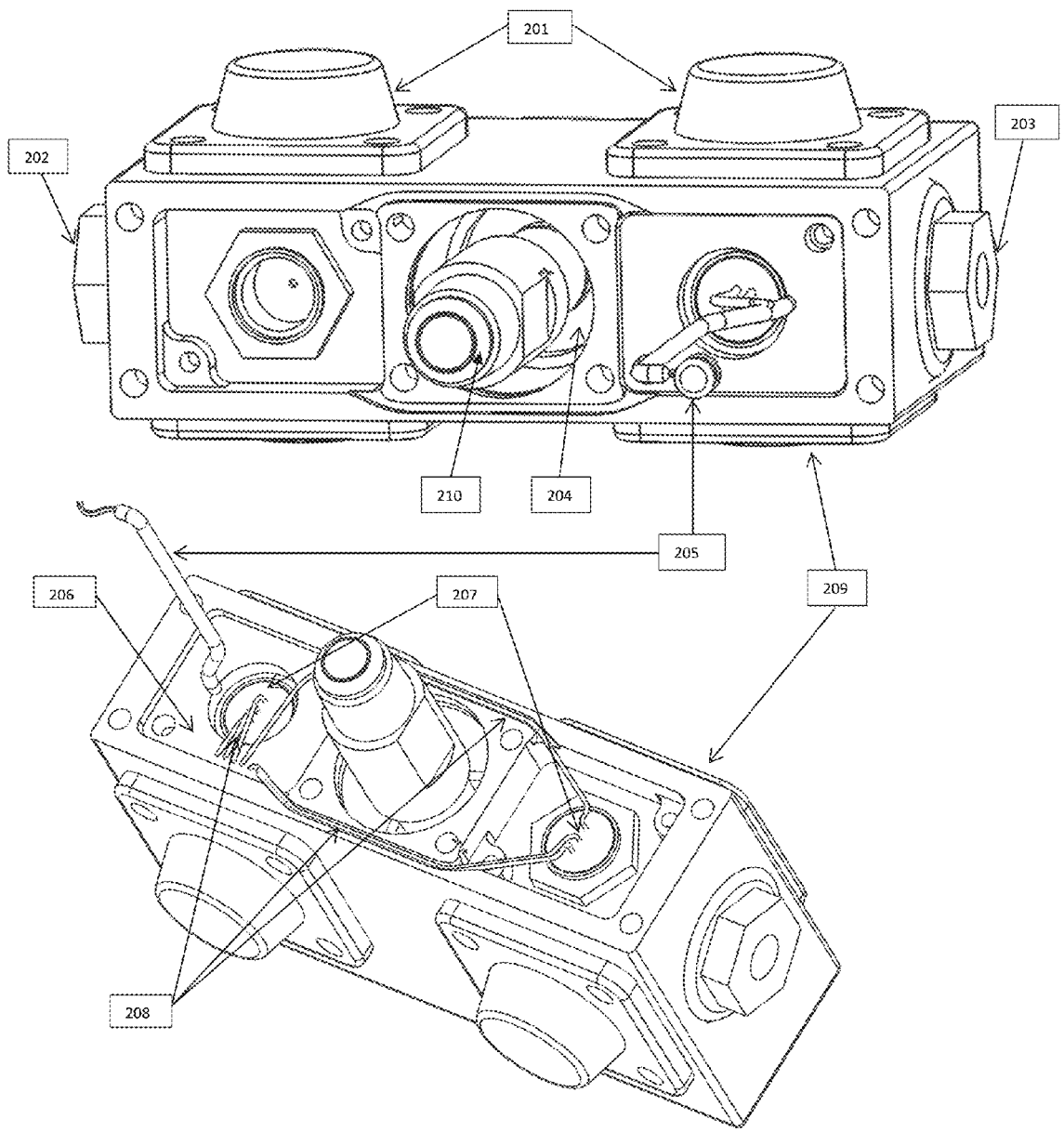
FIG. 2a shows two isometric views of the rotary wheel valve assembly.
Figure 2B:
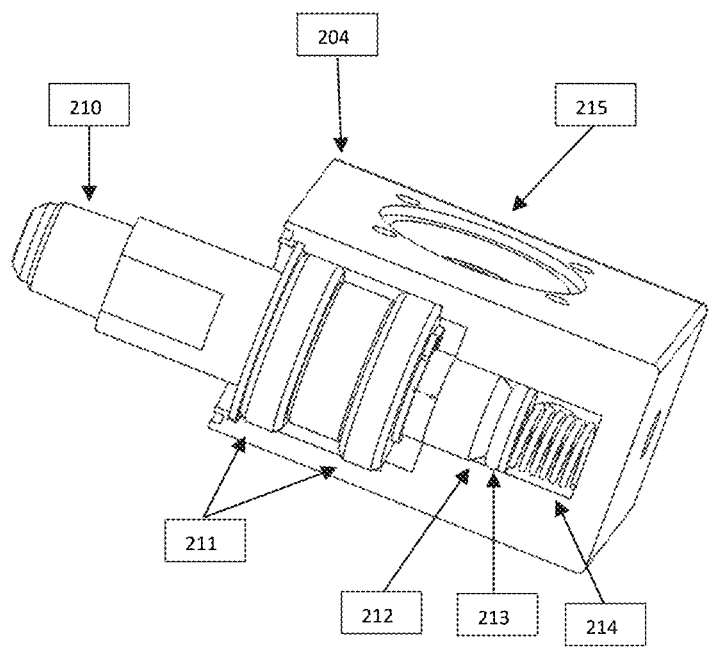
FIG. 2b is a drawing for the rotary mechanical face seal component of the rotary wheel valve assembly.
Figure 2C:
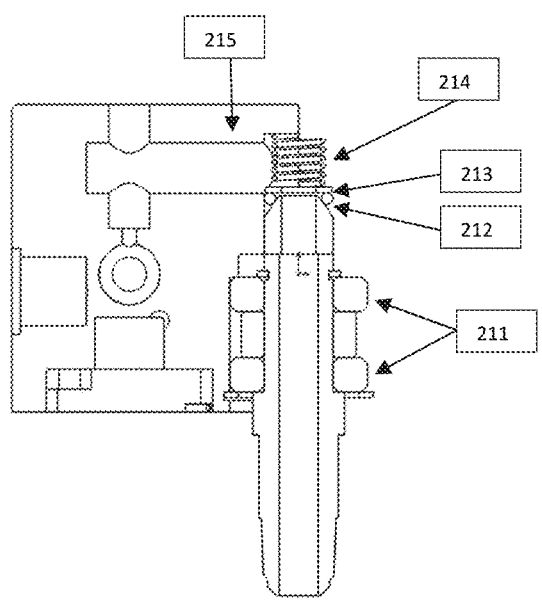
FIG. 2c is a cross-sectional drawing for the rotary mechanical face seal component of the rotary wheel valve assembly.

FIG. 2*a* shows two different angled views of a wheel hub mounting rotary wheel valve unit 209 that includes two built-in wheel valves, rotary union, pressure and temperature sensors, magnetic sensor and the electronic control circuitry; each rotary wheel valve unit can support one or two tires. Underneath the removable covers 201 there are two built-in wheel values (not visible in FIG. 2*a*) that control the opening and closing of the air path between the electronic manifold controller 101 and the tires; there are air passages inside rotary wheel valve 209 connecting the values to its respective air outlets 202 and 203 and then to the dual tires. Rotary union assembly 204 with a tubular shaft 210 is installed into a cavity in the rotatable rotary wheel valve base. The tubular shaft 210 with a central air passage is connected with the air tube from the electronic manifold controller 101 (FIG. 1). Two print circuit boards (PCB) 207 with sensors exposed to the respective air passage connecting to the respective tire are responsible for monitoring tire pressure and temperature in real time. Sensor output connection wires 208 for PCB 207 are connected to PCB 206, which contains the electronics that controls the sensors and communicates to electronic manifold controller 101. The positive terminal of PCB 206 is electrically connected to the tubular shaft 210 through the rotary wheel valve base and the rotary union. A single wire connecting electronic manifold controller 101 to the tubular shaft 210 supplies power to PCB 206 and on the same wire supports electronic data and control signal communication between electronic manifold controller 101 and PCB 206. Rotary wheel valve unit 209 is electrically insulated from the wheel hubcap top where it is mounted. To provide electrical grounding to PCB 206, wire 205 is connected with the hubcap and from there to the vehicle chassis ground. FIGS. 2*b* and 2*c* are detailed drawings of the rotary union, which is contained in housing 204 for installing in a cavity of the rotary wheel valve base with half of the rotary shaft exposed to outside. Shaft 210 is secured and support by bearings 211 in the housing in a way that the shaft can be stationary while the housing with the attached rotary wheel valve base can be rotatable. The shaft has in the housing end a seal face 212 that is facing an opposite seal face 213 for defining a rotary mechanical sealing interface, with spring 214 putting pressure on the back of seal face 213 for keeping a tight seal. The spring 214 behind seal face 213 has air passage 215 leading to the valves. Each seal face has a central opening for air to pass through while one section is rotating and the other section is stationary. Now the electronic manifold controller can pneumatically control the opening and closing of the rotary wheel valves to direct air flow from the air source through the manifold, the air tubes, the rotary shaft central passage, the mechanical seal face central openings, the valves and finally reaching the tires, or the other way around.

Figure 3:
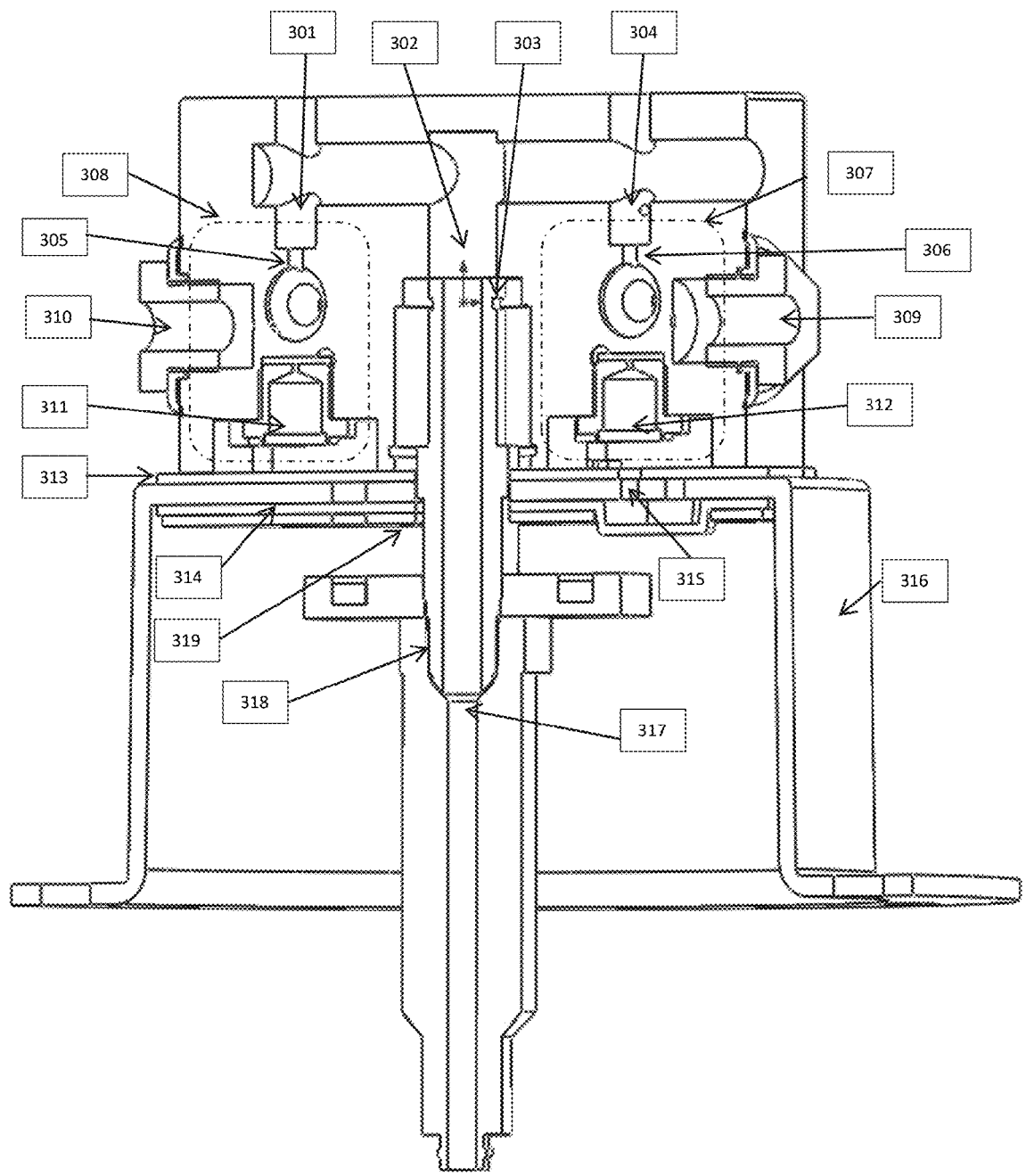
FIG. 3 is a cross-sectional drawing of the rotary wheel valve assembly mounted on the hubcap.

FIG. 3 is a sectional drawing of a rotary wheel valve assembly mounting on hubcap 316 for illustrating air distribution within this apparatus. The two values underneath covers 201 showed in FIG. 2*a* are indicated in FIG. 3 by two areas surrounded by dash lines. For inflating tires, air from the electronic manifold controller 101 (FIG. 1) with pressure higher than the tires passes through the tubing and enters inlet 317 at the tip of the rotary shaft 318, flows through an air passage inside the rotary shaft, passes through rotary mechanical seal 303, flows into cavity 302 and then flows into two separate air distribution passage 301 and 304 next to the respective wheel valve, from there air flows through small orifices 305 and 306 and into wheel valves 307 and 308. The higher air pressure forces wheel values 307 and 308 to open and allows air flowing into air outlets 309 and 310 for filling the connecting tires. FIG. 4 descriptions below discussed the opening of wheel valves with lower pressure source air from the electronic manifold controller to release the higher tire pressure. For deflating the tires, air flows in a reversed direction from the tires back to the electronic manifold controller and then to the atmosphere. Sensors 311 and 312 are installed in the air passage between the respective valve and the air outlet; each sensor is exposed to air from the respective tire for monitoring individual tire pressure and temperature. The electronic manifold controller powers the valve electronics via a single wire connecting to the metal rotary shaft 318 that is attached to the metal rotary wheel valve body. Thus the rotary wheel valve assembly is used as an electrical positive voltage power terminal for powering the electronics. The assembly includes electrical insulation sheets 313 and 314 placing between the rotary wheel valve and hubcap 316 for electrically insulating the rotary wheel valve with the metal hubcap. For electrical grounding, the PCB ground terminal wire will be connected with metal screw 315 to hubcap 316 that is mounted on the wheel.

Figure 4A:
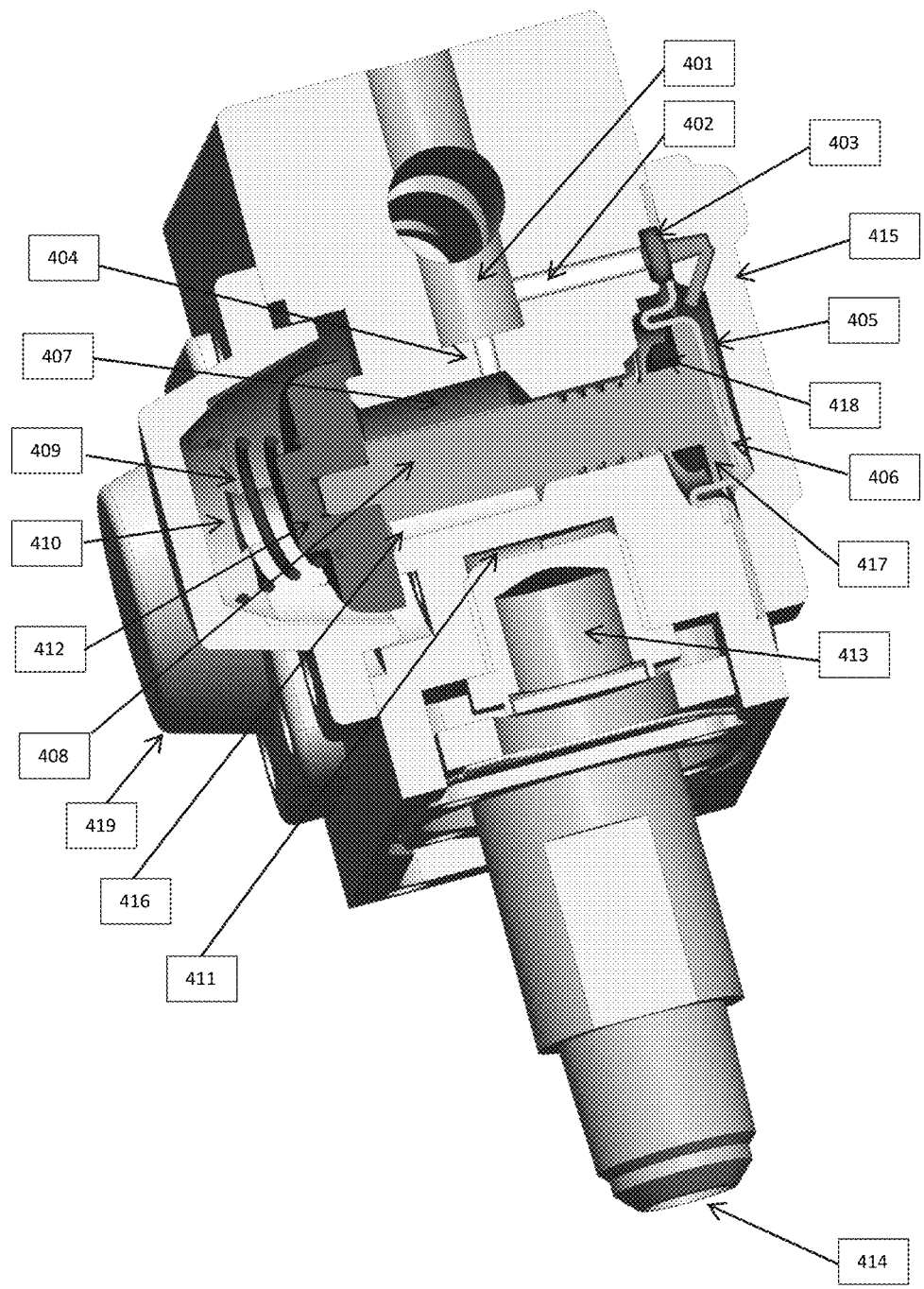
FIG. 4a is an angled cross-sectional side view of the rotary wheel valve assembly.

FIG. 4*a* is a rotary wheel valve assembly cross-section side view showing the built-in wheel valve structure in detail. There are two valve bodies built into two cavities in the rotary wheel valve assembly unit, with the rotary union fitting into an additional middle cavity. This drawing shows a valve cross-section view from the narrow side and therefore the rotary union is not visible. A wheel valve has three chambers. The top chamber 410 is under removable cover 419 on one broad side of the rotary wheel valve housing and the bottom chamber 405 is under removable cover 415 on the opposite side. Top chamber 410 has a poppet 412 that sits on seat 416 and separates the top chamber from the middle chamber 407. The middle chamber 407 contains a movable piston 408 with a large base 417 disposed against a flexible diaphragm 406 that separates the bottom chamber 405 from the middle chamber 407; the other end of the piston forms into a slender tip that fits into a cavity on the underside of poppet 412. The lower portion of the middle chamber 407 shapes into a cylinder tube 423 (FIG. 4*b*), which has a tight clearance between the cylinder wall and the piston 408 for restricting middle chamber air getting through to the piston base area. The bottom chamber 405 connects to the source air distribution passage 401 through air passage 402, whereas the middle chamber 407 also connects the source air distribution passage 401 but through orifice 404. Top chamber 409 connects to air passage 411 that leads to the tire port outlet. Spring 409 inside top chamber 409 is disposed under the cover 419 and pressed against poppet 412. Pressure sensor 413 is for monitoring air passage 411 to obtain real time pressure and temperature of the connecting tire. Sealing O-Ring 403 is for preventing chamber air and passage way air leaked through the gap between removable valve cap 415 and the apparatus body. When pressurized air flows into the bottom chamber 405, the pressure exerting through the flexible diaphragm 406 on piston base 417 will force the piston 408 to move upward against poppet 412. When the wheel valve is not pressurized, spring 409 will exert pressure on poppet 412, force the poppet to sit on the seat 416 and thereby close the valve. Otherwise, if the combined tire pressure and spring 409 pressure are smaller than the combined middle chamber 407 air pressure and the upward force exerting on poppet 412 that is produced by the bottom chamber 405 air pressure applying through piston 408, poppet 412 will be forced to move upward and unseat from the seat 416, thereby open the valve and allow air communication between the tire and the air source.

Figure 4B:
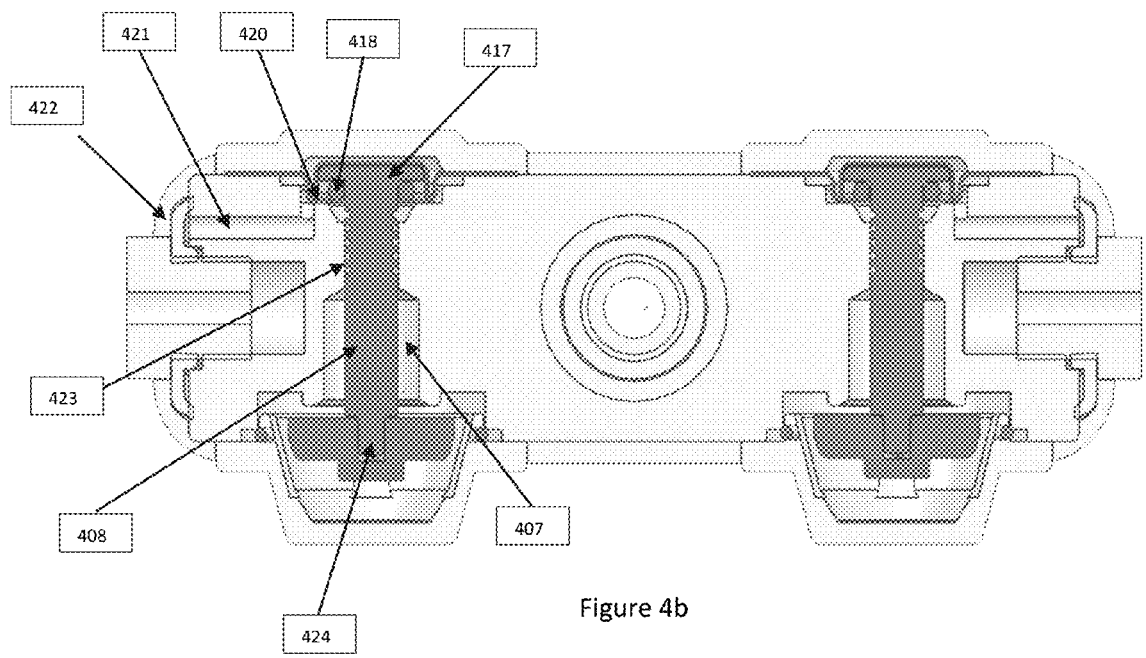
FIG. 4b is a cross-sectional top view drawing of the rotary wheel valve assembly.

FIG. 4b shows that above piston base 417 there is a sealing o-ring 418, next to the o-ring there is a small cavity 420 with a breathing hole 421 leading to atmosphere. Dust cover 422 is for covering up the breathing hole. When piston 408 moves toward poppet 412, o-ring 418 will seal off the cylinder base and prevent air leakage from the middle chamber to cavity 420. However, even though there is a tight clearance between piston 408 and cylinder 423 and the piston base o-ring 418 would provide a good air seal, air in the middle chamber 407 could still seep through and reach cavity 420 and causing pressure build-up in the cavity that would counteract the bottom chamber 405 pressure through diaphragm 406, thereby affecting the effectiveness of the piston upward movement. Therefore it is important to release any build-up air in cavity 420 to the atmosphere.

As described above for the wheel valve, even if the source air pressure is lower than the target tire pressure in top chamber 409, the valve can be opened by the combined source air pressure in chamber 407 and the additional push-up force exerting on poppet 412 that is produced by the bottom chamber 405 air pressure applying through piston 408. This wheel valve design can support pneumatically controllable opening of the valve and releasing of tire air with a source air pressure at ⅔ or more of the tire pressure. For tire deflation applications, the electronic manifold controller can monitor the tire pressure in real time and maintain proper source air pressure accordingly for keeping the wheel valves open to release tire air. During deflation, the electronic manifold controller will open the solenoid deflation valve and release air to atmosphere through the deflation orifice. In this way high tire pressure can be gradually reduced to a desirable level.

The wheel valve can be quickly closed when source air is rapidly withdrawn, causing source air pressure to be less than ⅔ of tire pressure. When source air is withdrawn, orifice 404 limits air in the middle chamber 407 from flowing out too quickly, whereas the air in bottom chamber 405 will escape faster and loss the pressure to push up piston 408, leading to the lowering of poppet 412 to sit on seat 416 and thereby close the valve.

Figure 5:
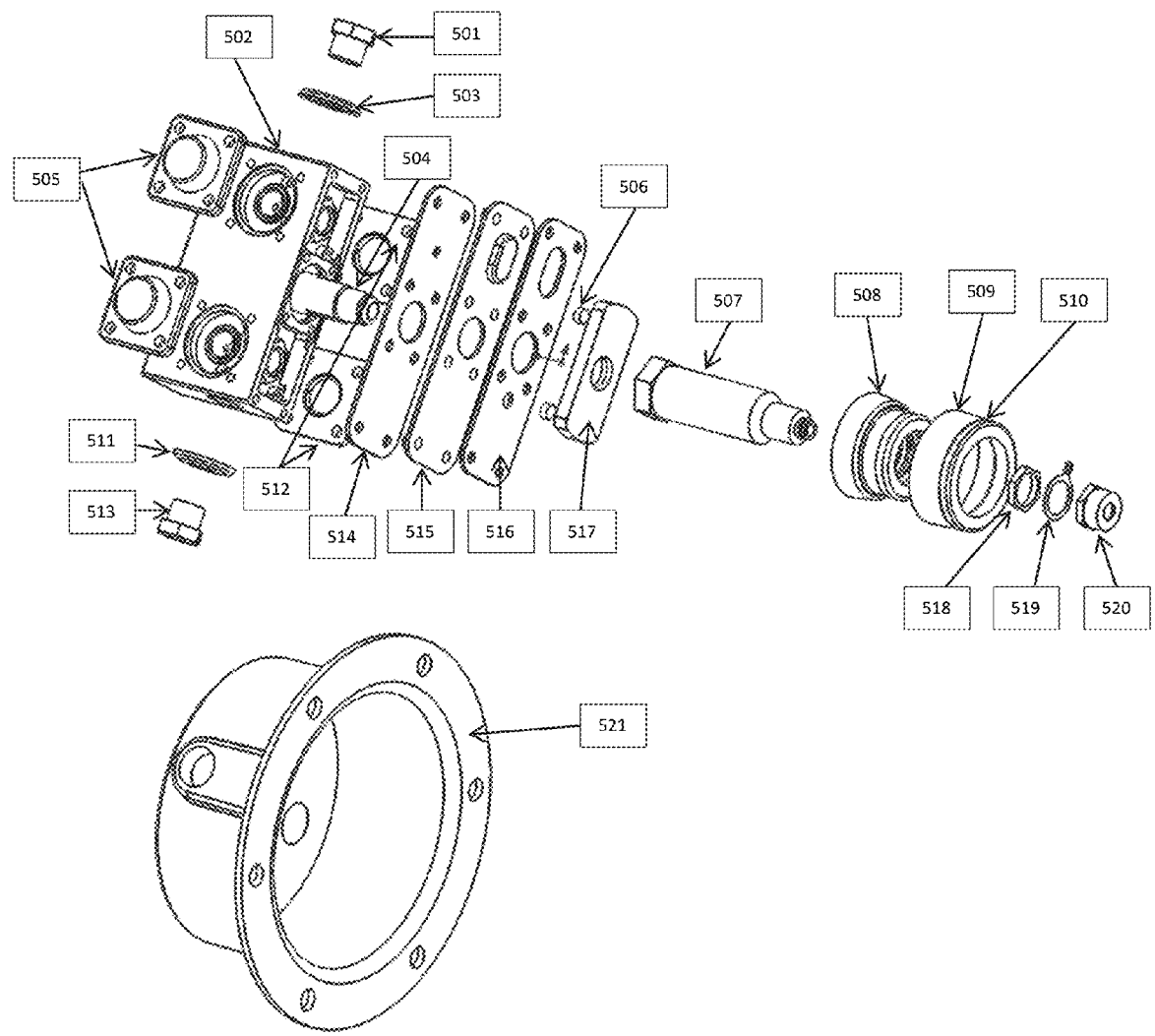
FIG. 5 is a component drawing of the hubcap and rotary wheel valve assembly.

FIG. 5 is a drawing showing the hubcap and rotary wheel valve assembly components. Rotary wheel valve body 502 has two removable top valve caps 505 and two bottom valve caps 512. The two tire ports have hose fittings 501 and 513 with locking set screws and air sealing O-Rings 503 and 511. Rotary union air inlet shaft 504 and wheel valve body 502 are to be electrically insulated from hubcap 521 using two insulation sheets 514 and 515. Metal plate 516 is affixed on the rotary wheel valve but also keeps electrically insulated by insulation sheets 514 and 515. Metal plate 516 is used for installing the wheel valve on hubcap 521 with screws. Magnet holder plate 517 with embedded magnet 506 is mounted on the stationary shaft for magnet sensor in the rotatable wheel valve electronics to detect the presence of magnetic field when the magnet passes by during wheel rotation, thus enabling the counting of wheel rotation for calculating tire usage. Another function of wheel rotation detection supports detecting locked wheels during extremely cold weather conditions. The rotary union shaft extension 507 slip into insulation holder 508 which insert into a coupling holder 509 with O-Ring 510. Metal contact ring 519, is connecting with a wire for providing positive electrical terminal connection to the metal rotary wheel valve body. The 518 is a security screw for 519 and then the 520 provides air tube fitting. Hubcap 521 has mounting holes on top for rotary wheel valve assembly installation.

Figure 6:
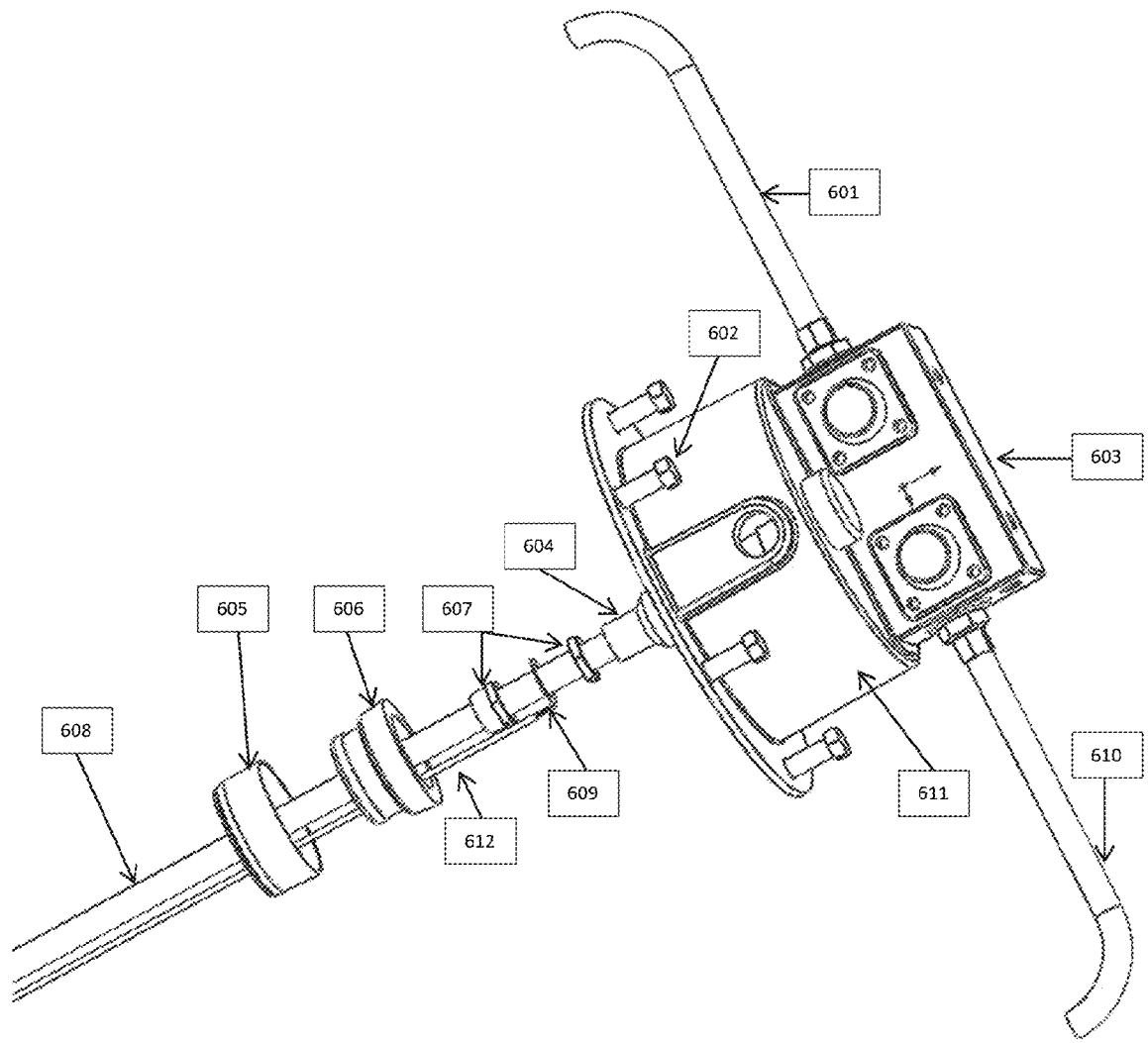
FIG. 6 is an isometric view of the rotary wheel valve assembly mounted on the hubcap.

FIG. 6 is a drawing showing rotary wheel valve assembly 603 mounted on hubcap 611 with accessories attached. Bolts 602 are for mounting the hubcap to the wheel axle. Two extension hoses 601 and 610 connect the rotary wheel valve tire ports to the respective dual tires valve stem. Air tube 608 from the electronic manifold controller is connected to rotary union shaft 604 and secured by fitting 607. Positive electrical wire 612 from electronic manifold controller is connected to positive electrical terminal contact ring 609 for powering the rotary wheel valve electronic unit and carrying communication data. An insulation holder cup is made up of two halves 606 and 607; the cup has a center hole for rotary union shaft 604 to pass through while keeping shaft 604 electrically insulated from the surrounding. The insulation holder cup is for plugging into the axle spindle bore and holding in place the rotary union shaft 604 and the connecting air tube 608.

Figure 7:
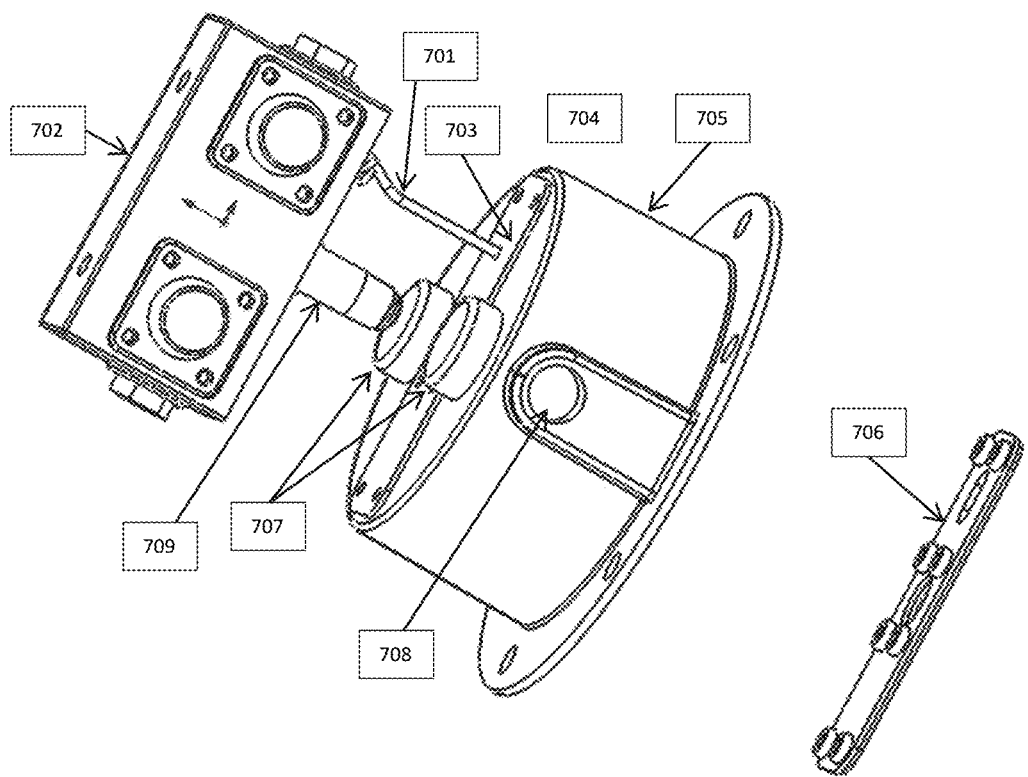
FIG. 7 is an isometric view of the rotary wheel valve positioned above the hubcap with power supply wire and rotary seal shaft passing through respective hubcap opening.

FIG. 7 is a drawing showing rotary wheel valve assembly 702 on top of hubcap 705 with rotary union shaft 709 inserting through an opening on the hubcap. Two insulation sheets 703 and 706 electrically insulate the rotary wheel valve from the hubcap, which is electrically in contact with the vehicle body. The rotary wheel valve electrical ground connection wire 701 runs through a small hole on the hubcap and then connects with hubcap bottom ground screw 801 (FIG. 8) for providing ground terminal connection to the rotary wheel valve electronic unit. Two small glass windows 707 on top of the hubcap are for viewing the axle lubrication oil level and the 708 is for refilling the lubricant.

Figure 8:
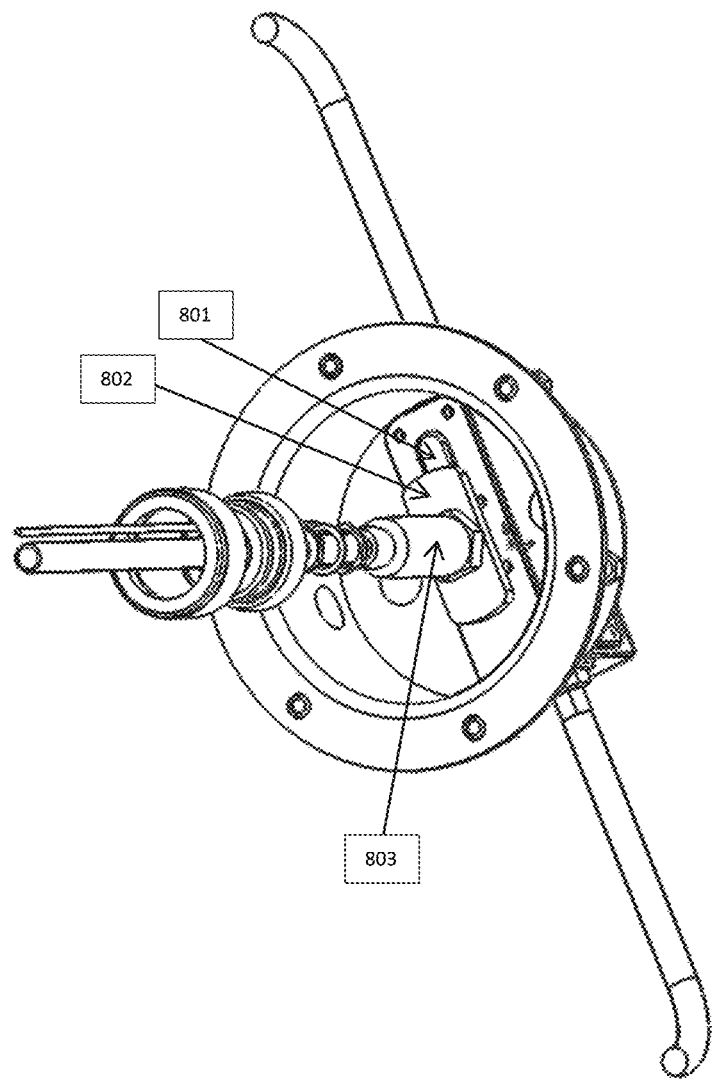
FIG. 8 is an isometric view of the rotary wheel valve assembly mounted on the hubcap showing the inside of the hubcap.

FIG. 8 is a hubcap and rotary wheel valve assembly inside view drawing. The 801 is a hubcap ground screw that is covered and protected by the bottom electrical insulation sheet. The 802 is a magnet holder plate to be secured on rotary union shaft 803 and is embedded with a magnet. When the vehicle moves, the electronic circuitry in the rotating rotary wheel valve can detect the presence of the magnetic field whenever passing by the magnet, and therefore is able to count the number of wheel rotation for calculating the distance of the vehicle traveled.

Figure 9:
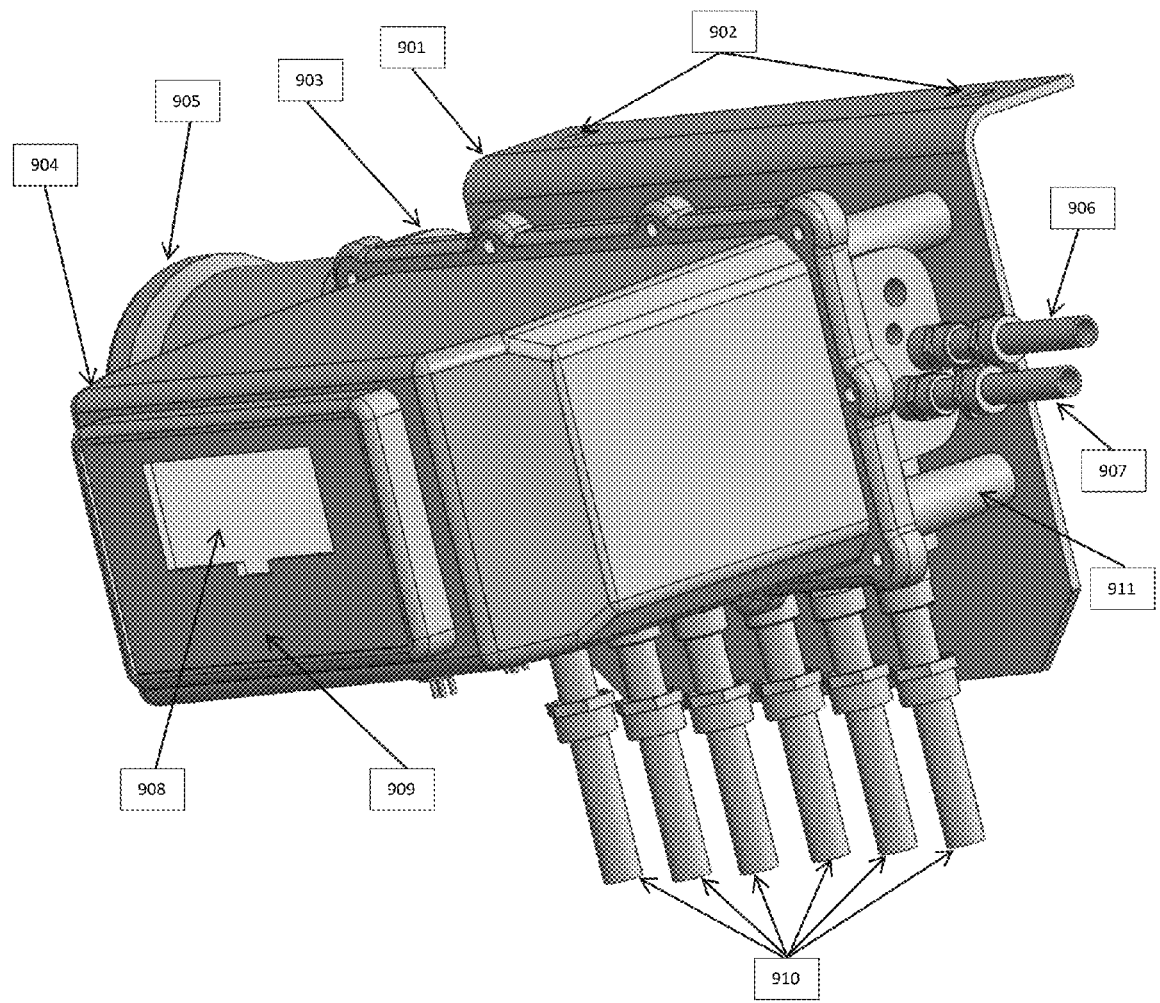
FIG. 9 is an isometric view of the electronic manifold controller secured on a mounting plate.

FIG. 9 is a drawing showing the electronic manifold controller secured on a mounting plate. Mounting plate 901 with mounting holes 902 is for mounting the electronic manifold controller 903 on the vehicle chassis. The electronic manifold controller has 4 legs 911 with screw holes for attaching the mounting plate. The electronic manifold controller has a weatherproof cover 904. Noise reduction muffler 905 is for suppressing the loud noise produced by the pressurized air rapidly releasing from quick exhaust valve 1008 (FIG. 10) when closing the rotary wheel valves. The 908 is a LCD display showing data, warnings and control information. Keypad 909 is for user entering commands and programming the electronic manifold controller. Air source inlet 907 takes in pressurized air input from the vehicle air compressor for inflation and deflation operations. The other air inlet 906 takes in the pressurized air input from the vehicle air springs for calculating vehicle load. Air ports 910 connect to the respective rotary wheel valve via air tubes going through the vehicle's hollow axles. Each air tube is bundled with a wire for connecting the electronic manifold controller with the rotary wheel valve; the wire is for providing power to wheel valve electronics and for data communication.

Figure 10:
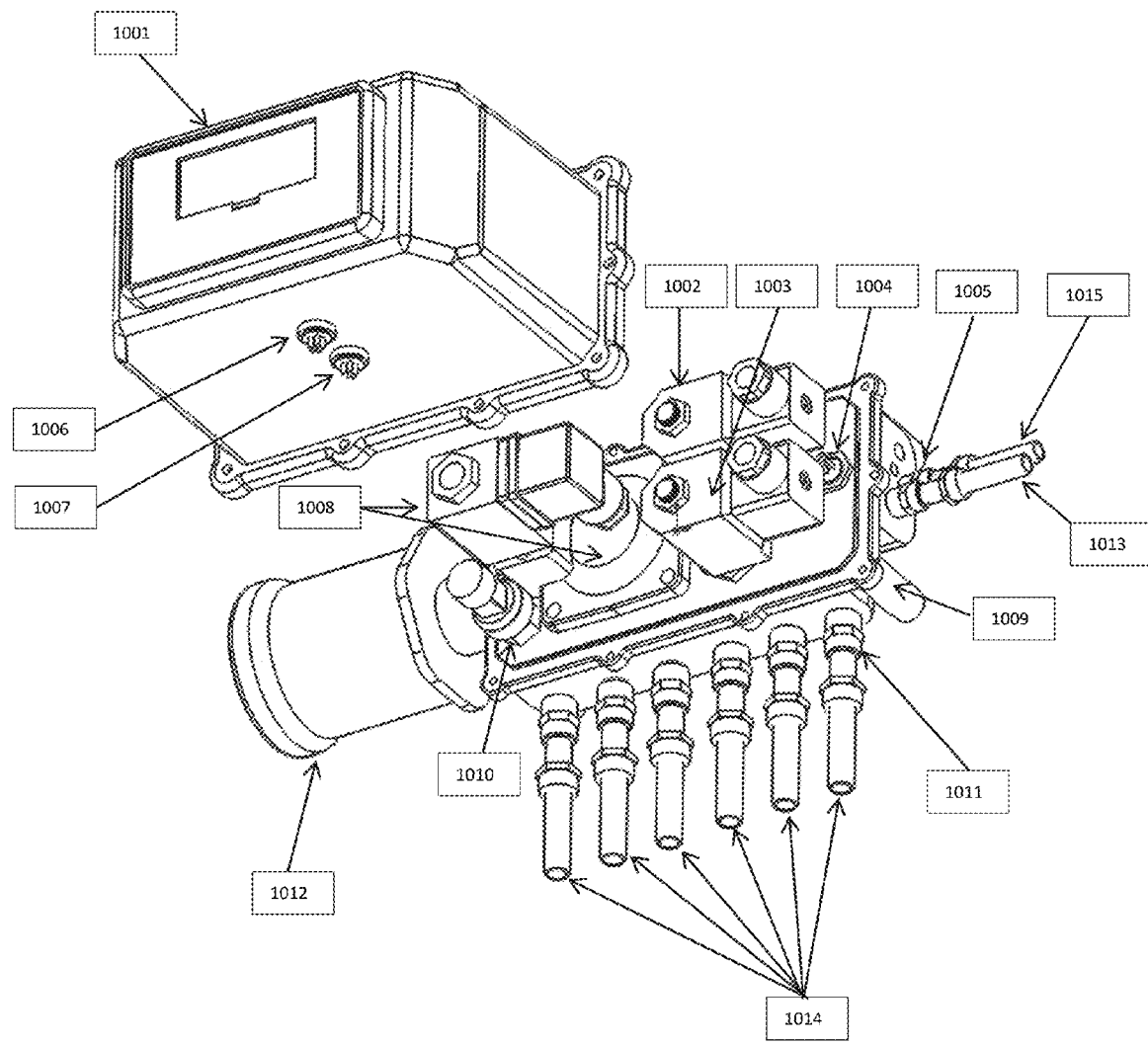
FIG. 10 is an isometric view of the electronic manifold controller with cover lifted and showing the inside.

FIG. 10 is a drawing showing the inside of the electronic manifold controller. The electronic manifold controller cover 1001 can be plastic or metal and is weatherproof. Connector 1006 is for connecting to an external power source and for outputting alarm signals. Connector 1007 is for connecting to each rotary wheel value with a single wire for providing power and for data communication. The manifold has an air chamber inside that is connecting to deflation solenoid valve 1002, inflation solenoid valve 1003, quick exhaust solenoid valve 1008, pressure transducer 1010, and air ports 1014. Pressure transducer 1010 monitors the air pressure in the manifold air chamber. The normally close inflation valve 1003 can be opened and let in through air inlet 1013 the pressurized air from the vehicle compressor for opening the wheel valve and inflating tire pressure. The normally closed deflation valve 1002 can be opened to slowly release tire air through a deflation orifice to the atmosphere; the manifold controller would manage the pressure for keeping the rotary wheel valves to stay open during the deflation period. Priority pressure sensor 1004 connects to air inlet 1013 and monitors the vehicle compressor pressure level to ensure that the manifold controller would not perform tire inflation when the compressor pressure is at or below a safe level to support normal vehicle braking operation. Load sensor 1005 connects to air springs inlet 1015 and monitors vehicle suspension air springs pressure for the manifold controller to calculate current vehicle load, thus enabling the system to determine if vehicle tire pressure needs to be adjusted with respect to full vehicle load, half load and empty load for keeping tires in optimal pressure condition. The 1009 is one of the four legs with screw ports for securing the manifold on the mounting plate.

The manifold air chamber and the connecting air tubes and the wheel valves are normally not pressurized. Whenever necessary, the system will conduct a sequence of steps to perform tire pressure adjustment. In a pressure adjustment procedure, the system will first monitor air source through priority pressure sensor 1005 to ensure there is sufficient air pressure to support the system operation. Next the system will close the normally open quick exhaust valve and open the inflation valve for building up manifold air chamber pressure to a level that will cause the opening of all rotary wheel valves connecting to the tires. If there are no flat or leaky tires, tire air would flow through the opened wheel valves, balance through the manifold air chamber and thereby achieves tire pressure equalization. The system would use pressure transducer 1010 to measure manifold chamber air pressure for determining current tire pressure. If the manifold chamber pressure is lower than target set point pressure then the system would open the inflation solenoid valve and fill up the tires to the desired pressure level with source air. If the tire pressure is higher than the desirable level then the deflation solenoid valve will be opened for releasing air. During inflation or deflation, whenever manifold chamber pressure reaches the target set point, the system will open the quick exhaust solenoid valve to rapidly release the pressurized air in the manifold chamber, the air tubes and the valves that will cause the immediate closing of all rotary wheel valves.

In a normal vehicle operation, when the vehicle starts up the system will carry out the pressure adjustment procedure once to establish proper operating tire pressure. During the vehicle travelling trip, the system will continuously collect tire pressure and temperature information in real time from the wheel valves sensors but does not adjust the tire pressure until pressure variation exceeded a predetermine tolerance. If a tire leak develops and causes pressure slowly to drop then a warning will be issued, meanwhile the system will try to maintain the tire pressure through inflation to compensate for the gradual air loss. If a tire blowout occurred and caused air loss rapidly, however, the system will not attempt to maintain the tire pressure but issue a warning to alert the driver. In a normal vehicle operation the tires will get hot after a prolong drive, and the tire pressure could be substantially higher than cold tire pressure, in this case the system will deflate tire pressure to the desired level for protecting the tires. When tires cool down and the pressure drops down, the system will be adjust the tire pressure back to the normal level. With the load sensor 1015 measuring pressure data from the vehicle air springs, this intelligent system can determine the vehicle load (e.g., full/half/empty) for automatically adjusting tire pressure in accordance to the tire manufacturer's recommended tire pressure with respect to load. The system also supports manual selectable adjustment of tire pressure based on vehicle load such as full/half/empty load and road conditions such as snow, mud, sand, highway, or cross country driving. The system also has a fail-safe operating procedure when the tire data becoming unavailable (e.g., wheel valve electronics went down). In this situation the system will automatically perform tire pressure adjustment every half hour or so.

Figure 11:
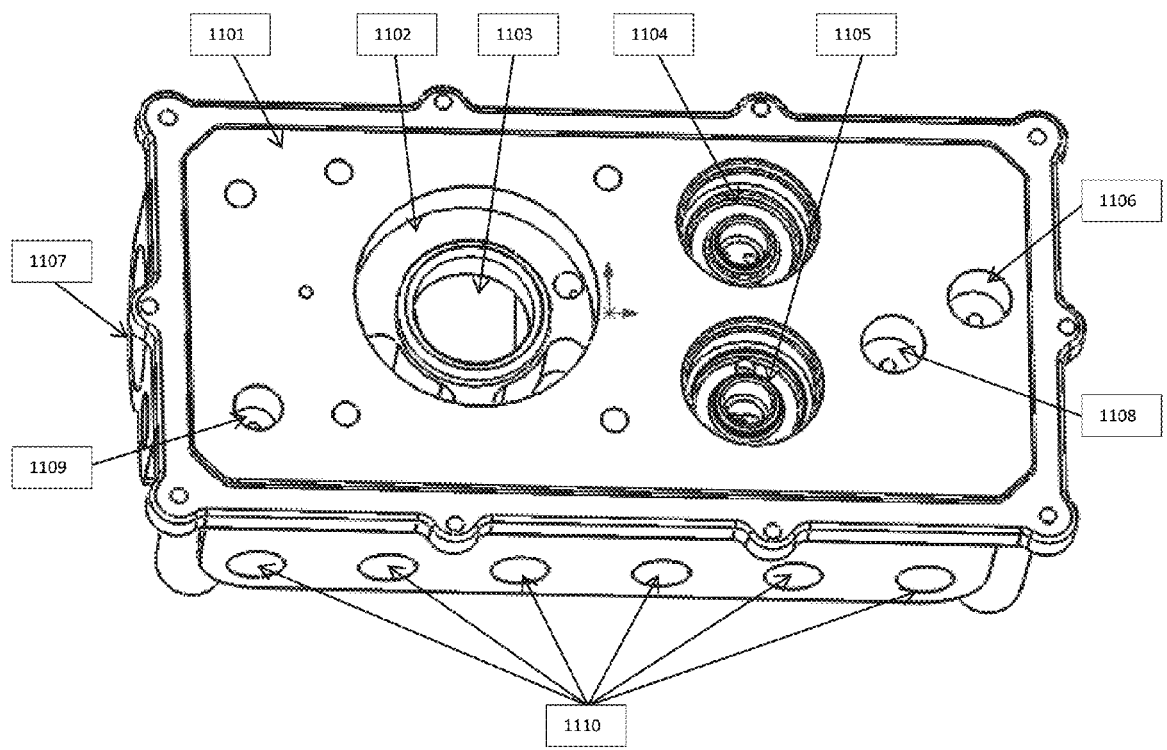
FIG. 11 is an isometric view of the manifold block of the electronic manifold controller with major components removed.

FIG. 11 is a drawing of the electronic manifold controller base without the components. The 1101 is a metal manifold base. The pressure transducer mounting hole 1109 connects to the manifold air chamber for the mounted pressure transducer to monitor the manifold air chamber pressure. The quick exhaust valve cavity 1103 is connected through an inside passage to air outlet 1107 that opens to the atmosphere; air outlet 1107 would be fitted with a noise reduction muffler. The quick exhaust valve is also connected with the manifold air chamber through cavity 1102. The 1104 is the deflation valve cavity and 1105 is the inflation valve cavity. The 1108 is the priority pressure sensor mounting hole and the 1106 is the load sensor mounting hole. Manifold air ports 1110 communicate to all rotary wheel valves through the connecting air tubes.

Figure 12:
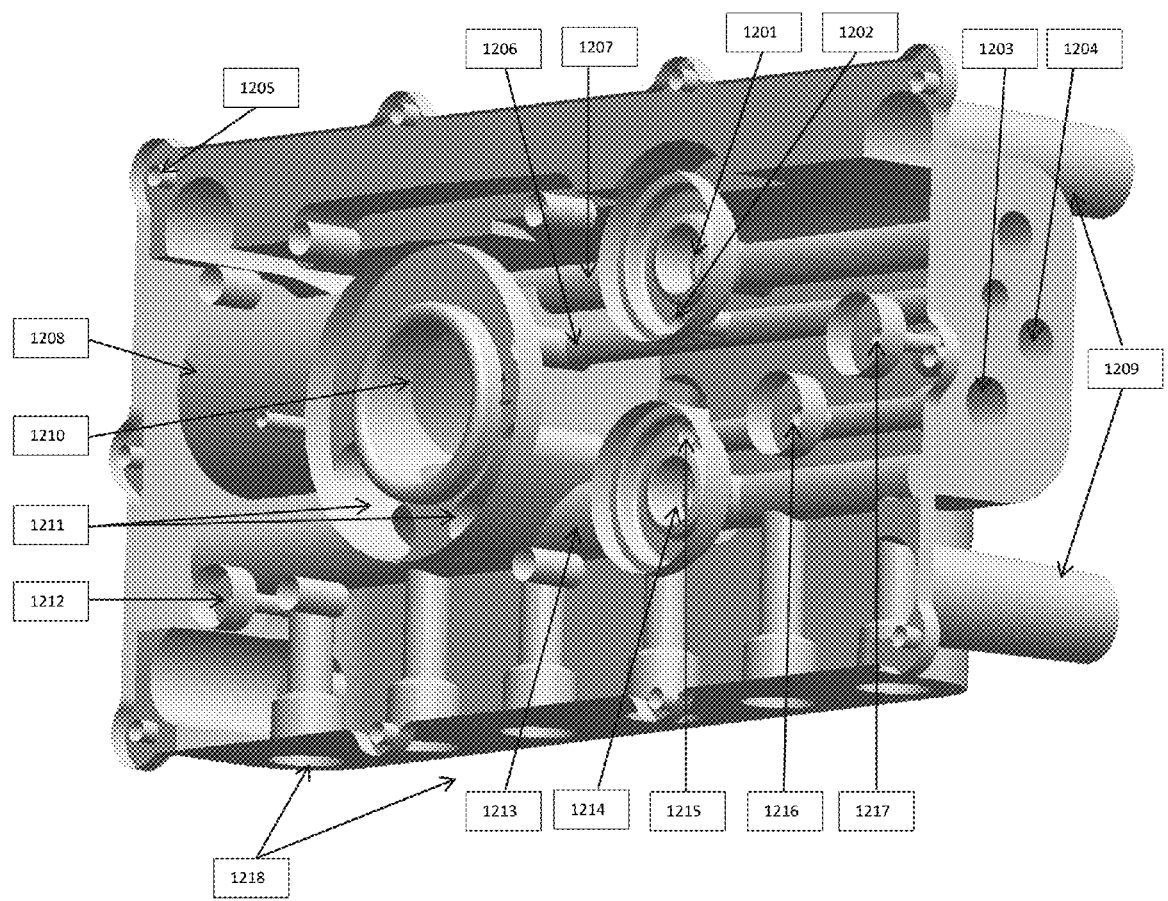
FIG. 12 is an angled cross-sectional view of the manifold block of the Electronic manifold controller.

FIG. 12 is an electronic manifold controller base section inside drawing. Deflation solenoid valve cavity 1202 communicates with manifold chamber 1211 through an air passage. Deflation valve also communicates with cavity 1201 that, through air passage 1207, connects to cavity 1208 that opens to the atmosphere through an orifice. Cavity 1201 has a deflation orifice restricting air releasing speed for maintaining a proper wheel opening pressure during deflation. When deflation valve opens, manifold chamber air will flow out from the manifold chamber through the previous described air paths to the atmosphere. To increase manifold chamber air pressure, solenoid inflation valve is activated to open up the air path for air flowing from inlet 1203 into inflation valve cavity 1215 and then through cavity 1214 flowing into the manifold air chamber 1211. The priority pressure sensor can monitor air source pressure from sensor mounting hole 1216. The load sensor can monitor vehicle load pressure from sensor mounting hole 1217 which is connects to the vehicle suspension air springs pressure inlet 1204. To close all rotary wheel valves, quick exhaust solenoid valve is opened to quickly release air in manifold chamber 1211 through the large exhaust hole 1210 leading to atmosphere hole 1208. The hole 1212 is mounted with the pressure transducer for monitoring the manifold chamber air pressure. The manifold chamber air ports 1218 connect to all rotary wheel valves by air tubes. Screw hole 1205 is one of the ten holes for securing the weatherproof cover on the manifold controller base with screws. Each of the four legs 1209 on the manifold base has threaded hole for securing on the mounting plate with a screw.

Figure 13:
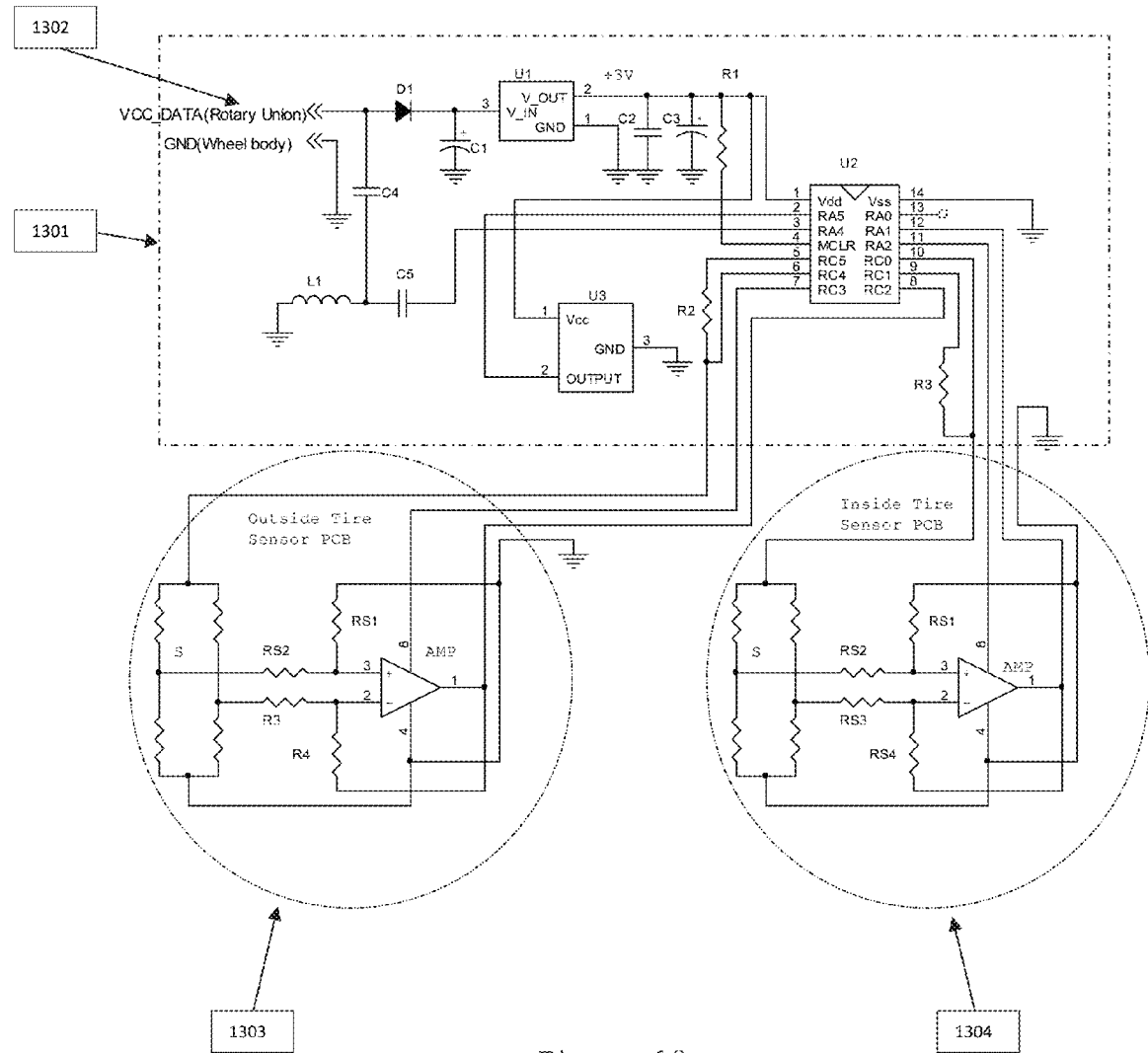
FIG. 13 is the schematic of the rotary wheel valve electronic circuitry.

FIG. 13 shows a schematic of the rotary wheel valve electronic circuitry. One electronic unit works with two wheel valves and consists of a data processing PCB 1301 and two sensor PCBs 1303 and 1304. Each sensor PCB contains a piezoresistive pressure sensor S, resistors RS1, RS2, RS3, RS4 and a micro-power amplifier AMP. Sensor S comprises four strain resistant sensitive resistors diffused in silicon. These resistors are connected in a Wheatstone bridge configuration, whereby two resistors increase resistance with positive pressure while the other two resistors decrease in resistance. When pressure is applied to the sensor, the resistors in the arms of the bridge of the sensor changed resistance by an amount directly proportional to the pressure applied. When a voltage is applied to the bridge, there will be a resulting differential output voltage based on arms resistance that can be used to calculate the sensed tire pressure. The micro-power amplifiers AMP with resistors RS1-RS4 condition the sensed tire pressure voltage to a high level for A/D conversion. These two sensor PCBs are secured in locations 207 (FIG. 2a) of the two rotary wheel valves are fully sealed. Each sensor PCB has four wire terminals connecting to the data processing PCB 1301.

The data processing PCB 1301 is installed in location 206 of the rotary wheel valve unit 209 (FIG. 2). The positive voltage power from electronic manifold controller 101 (FIG. 1) to rotary wheel valve unit, as described in the FIG. 2a description, is connected to VCC/DATA input terminal 1302 of data processing PCB 1301 and further connected to protection diode D1 and coupling capacitor C4. As described in the FIG. 2a description, the power input from electronic manifold controller 101 cannot be connected directly to the PCBs of the rotatable rotary wheel valve unit 209. Instead the input wire is connected to rotary union shaft 210 so that input power must pass through rotary union bearings and lubricants in the rotary wheel valve assembly before reaching the PCBs. As a result the input power voltage would be unstable due to electrical resistant variations in the power travelling path. To establish a stable power supply, PCB 1301 includes low-drop power regulator U1 for converting input voltage to +3V and together with capacitor C1 will stabilize the voltage. A high performance CMOS eight-bit microprocessor U2 with filter capacitors C2 and C3 processes data, controls I/O and manages power. The data processing PCB 1301 further consists one micro-power magnet sensor U3 plus a 125 KHz serial resonance loop C5 and L1 connecting to CPU modulated data output U2's pin3. The tire pressure voltage signals from two sensor PCBs are inputs to the PCB 1301's on-chip A/D converter of microprocessor U2 for producing the tire pressure measurements in digital form. To reduce component cost, this PCB 1301 design utilizes one microprocessor to process inputs from both pressure sensors and then combines the dual tire pressure data to form a single message for 125 KHz low frequency signal transmission through the power line back to the electronic manifold controller.

For reducing the PCB circuit size, an internal 4 MHz RC oscillator is used to clock the microprocessor U2. Under program control, microprocessor U2 outputs an encoded digital message data string for amplitude shift keying modulation with the 125 KHz carrier signal coming from the internal pulse-width modulator (PWM) circuit. The U2 outputs include the dual tire temperature readings that are calculated from sensor S data sent to respective U2 pin 6 and pin 10 through serial resisters R2 and R3 connection.

Figure 14:
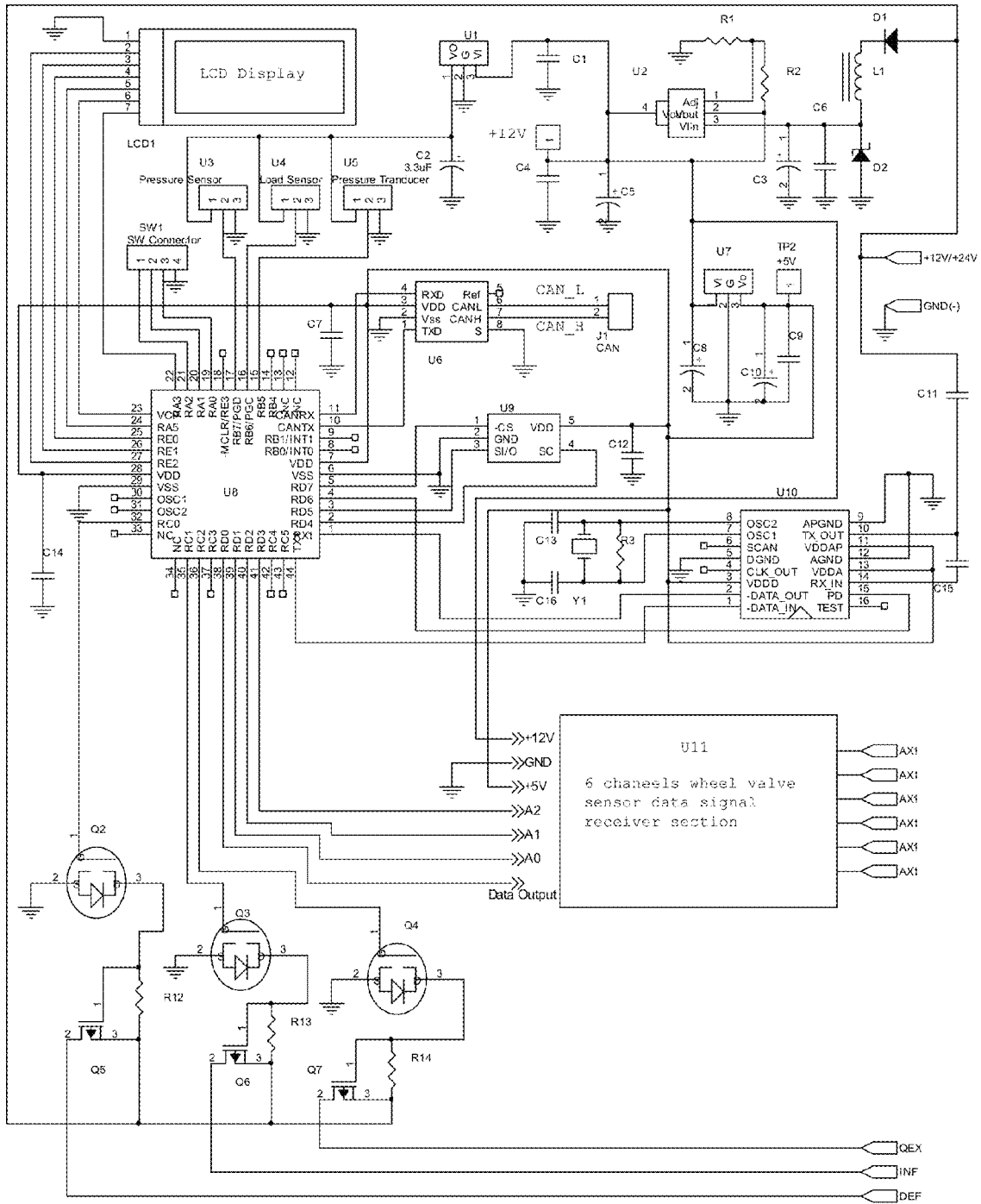
FIG. 14 is the schematic of the electronic manifold controller circuitry.

FIG. 14 shows an electronic manifold controller schematic diagram for the electronic design of the power module, display/keypad module, ccommunication module, central data processing module, temperature sensor module, pressure sensor module, solenoid driver module and rotary wheel valve electronic unit power/data processing module. The power module includes power protection circuitry with one +12V regulator U2, one +5V precision regulator U1 and one +5V high current regulator U7. The display/keypad module includes one LCD module LCD1 with built-in LCD driver for information display and a keypad switch connector SW1 to handle keyed-in data input by user. The communication module includes one CAN bus driver U6 and one power line communication transceiver U10 to handle data communication between the electronic manifold controller and user electronic devices installed on the vehicle. The central data processing module has a high performance central processor unit U8 to process all data, handle input and out, and intelligently manage tire pressure with respect to vehicle load and terrain conditions. The temperature module is a precision temperature sensor U9 that provides environment temperature for system sensor automatic calibration. The pressure sensor module includes one priority pressure sensor U3, one air springs load sensor U4 and manifold transducer U5. The solenoid driver module includes pre-driver Q2, Q3, Q4 and high power driver Q5, Q6, Q7 to active deflation solenoid valve, inflation solenoid valve and quick exhaust solenoid valve. This electronic manifold controller schematic diagram shows support for up to 6 trailer tires. The circuit design can be easily modified to support more or less tires. The power supply and data processing module U11 for rotary wheel valve electronic unit 209 is descripted next in FIG. 15 discussions.

Figure 15:
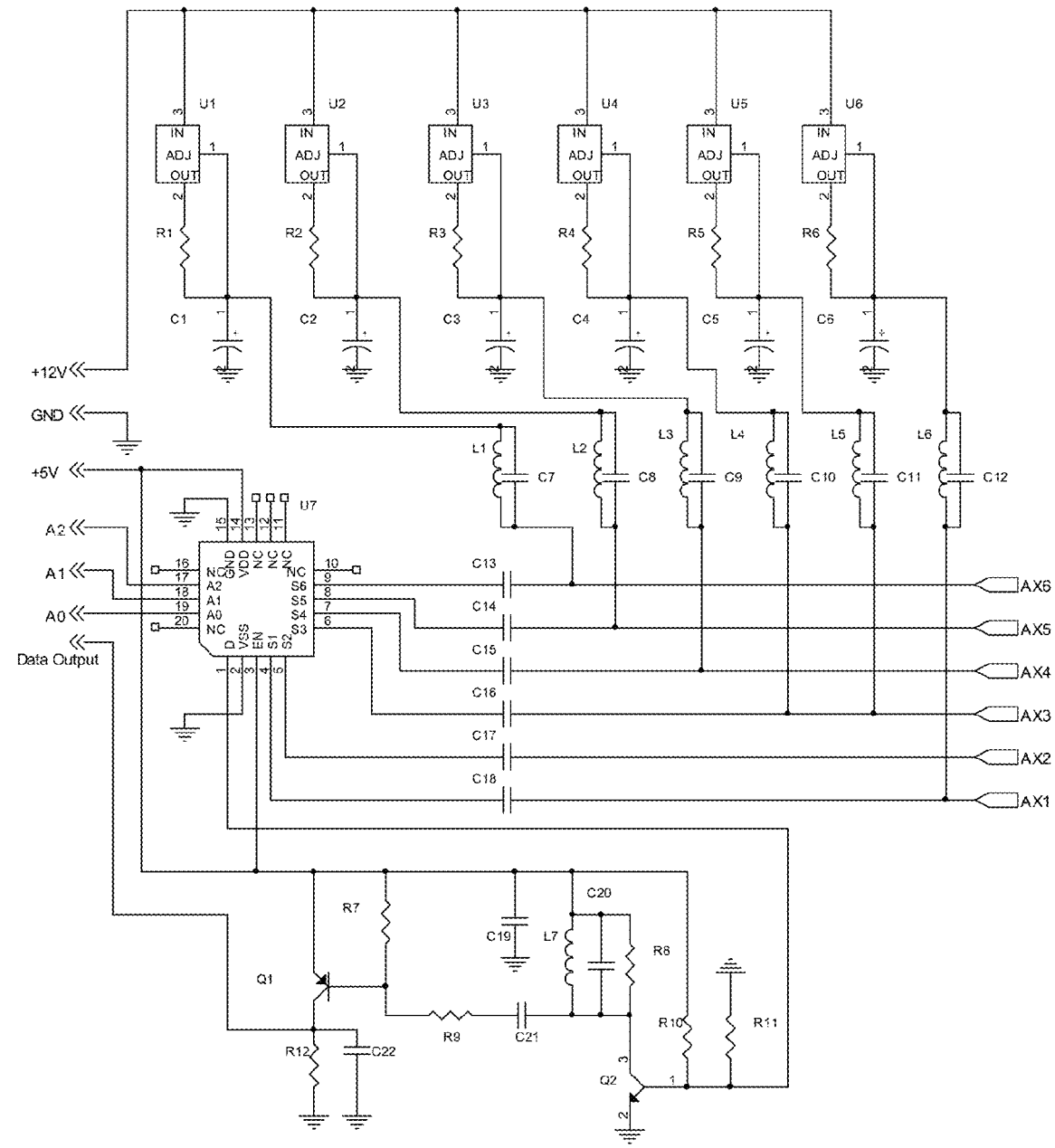
FIG. 15 is the schematic of the wheel valve sensor signal receiving section in the electronic manifold controller circuitry.

FIG. 15 shows the U11 circuitry that supports providing stable power to the rotary wheel valves electronic unit 209 from electronic manifold controller 101 and performing data demodulation using the same power wire. Power from the electronic manifold controller must pass through the rotary union bearings to reach the rotary wheel valves electronics, and then return to the ground (i.e., vehicle chassis) through the hubcap and the wheel axle bearings. It is technically very challenging to maintain stable power supply through bearing contacts and at the same time support reliable data and control signal communication between the two devices. Since a vehicle axle bearing contact resistance might change randomly from a few $\Omega$'s to over 10K$\Omega$ and would cause the current flow to fluctuate if the voltage remains constant, it is necessary to be able to dynamically adjust the voltage level with respect to the resistance changes for maintaining a stable power supply. The FIG. 15 schematic diagram shows circuit design to support 6 power lines, where U1 to U6 are six current limiters providing stable power to rotary wheel valves electronics through the respective AX1 to AX6 connection. The R1 to R6 are current sensing resistors and the C1 to C6 are filter capacitors for suppressing interfering electronic noise. To transmit data over the noisy DC power line, sensor data is modulated by a low frequency 125 KHz carrier. The six parallel resonance loops L1-L6 and C7-C12 show high impedance for carrier frequency and show low resistance for DC to power AX1 to AX6. The coupling capacitors C13-C18 remove the DC elements and only pass AC signals into multiple switch U7. By selecting A0-A2 level with the CPU, U7 can be switched to one of the AX1-AX6 inputs, and the output signals from U7 is connected to the following carrier amplifier that is composed of one NPN transistor Q2, base bias resistors R10-R11 and carrier resonance loop L7-C20-R8. The NPN transistor Q2 outputs the carrier signal through C21 and R9 to data detector Q1 with R7, and C22 for data demodulation.

The above system and methods describe a preferred embodiment using exemplar devices and methods that are subject to further enhancements, improvement and modifications. However, those enhancements, improvements modifications may nonetheless fall within the spirit and scope of the appended claims.

Additional Preferred Embodiments and Scope

The above preferred embodiment illustrated a typical embodiment of the present invention. Although the description above contains much specificity, these should not be construed as limiting the scope of the invention but as merely providing illustrations of some of the presently preferred embodiments of this invention. There are various possibilities with regard to additional embodiments. Thus the scope of the invention should be determined by the following claims and their legal equivalents, rather than by the examples given.

What we claim as our invention is:

1. A rotary wheel valve assembly to be utilized in a tire inflation and deflation system on a vehicle with dual tires, comprising:
   [A] rotary union means, comprising:
      [I] a casing defining a chamber, said casing having an air passage outlet connecting to said chamber;
      [II] a shaft rotatably mounted in said chamber, said shaft having a central air passageway, said shaft having a seal face with a central hole one end and an air inlet on the other end, said shaft air inlet end extending beyond said chamber;
      [III] a second seal face fitting inside said chamber in an airtight sealing engagement to said shaft seal face, said second seal face having a central hole for air communication with said shaft air passageway and said casing air outlet, whereby establishing air communication between said shaft air inlet and said casing air outlet;
   [B] wheel valve means, comprising:
      [I] a valve body having an air inlet passageway and an air outlet passageway;
      [II] a bottom chamber in said valve body connecting to said air inlet passageway;
      [III] a middle chamber in said valve body separating from said bottom chamber by a flexible diaphragm, connecting to said air inlet passageway through an orifice, having:
         (a) a piston movable within said middle chamber, said piston engaging to said diaphragm for movement with said diaphragm;
         (b) a valve seat;
      [IV] a top chamber disposed proximate to said middle chamber, having:
         (a) air passageway means connecting to said air outlet passageway;
         (b) a poppet sitting on said valve seat and separating the top chamber and the middle chamber, said poppet engaging said piston in the middle chamber and movable relative to said piston;
         (c) spring means compressively urging said poppet toward seating disposition;
   [C] housing means, attachable to a hubcap for rotation with said hubcap, comprising:
      [I] two cavities, each containing a said wheel valve;
      [II] a space for containing said rotary union;
      [III] air inlet means for air communication to source air;
      [IV] air outlet means for air communication to said dual tires;
      [V] air passageway means establishing air communication for said rotary union, wheel valves, air inlet and air outlets.

2. The rotary wheel valve assembly of claim 1, further including electronic monitoring means with components mounting on print circuit boards, comprising:
   [A] pressure and temperature sensor means for measuring the fluid pressure and temperature within top chamber of each said wheel valve;
   [B] magnetic sensor means for detecting the magnetic field produced by a magnet to be installed nearby;
   [C] control means receiving said pressure and temperature sensor data for calculating tire pressure and temperature in real time, receiving magnetic field detection data for counting wheel rotations, and communicating with an external device;
   [D] power supply means for powering up the electronics.

3. The electronic monitoring rotary wheel valve assembly of claim 2, further including a hubcap assembly, comprising:
   [A] a hubcap installing on a wheel covering the end of an axle,
   [B] an opening on top of said hubcap allowing rotary shaft of said rotary wheel valve to pass through;
   [C] rotary wheel valve mounting means for securing said wheel valve on exterior of said hubcap, with said rotary shaft passing through said hubcap opening, comprising:
      [I] power supply means connecting external power to rotary shaft and onto rotary wheel valve electronics;
      [II] electrical insulation means for electrically insulating said rotary wheel valve body and rotary shaft with said hubcap;
      [III] rotary wheel valve electrical grounding means for connecting grounding wire of said rotary wheel valve to hubcap for providing a grounding terminal;
      [IV] fastener means for securing said rotary wheel valve on said hubcap;
   [D] a plate with an embedded magnet mounting on said rotary shaft;
   [E] a hollow spindle with a high temperature rubber welsh plug plugging into hollow spindle for holding the rotary shaft, preventing leaking of lubricant oil from said hubcap, and electrically insulating the rotary shaft from the vehicle axle.

4. The hubcap mounting electronic monitoring rotary wheel valve of claim 3 further including a method of providing electrical power and supporting electronic communication through a single wire to said rotary wheel valve mounted on a rotating vehicle wheel, comprising:
   [A] a wire having one end connecting to the rotary union shaft in said rotary wheel valve and the other end connecting to an external device, said wire carrying power from said external device passing through the rotary union bearings and reaching the positive terminal of the rotary wheel valve electronics, said wire supporting electronic communication between rotary wheel valve electronics and the external device;

[B] a wire connecting the rotary wheel valve electronics ground terminal to the hubcap, said hubcap being electrically conductive to the vehicle chassis through axle bearings;

[C] a power current limiter on said wire adjusting power voltage to wheel valve electronics for overcoming variation in electrical resistance introduced by rotary union and vehicle axle bearings and lubricants;

[D] low frequency carrier data modulation means for carrying data from wheel valve back to said external device on the same power line;

[E] low frequency carrier data demodulation means in said external device for extracting wheel valve data.

5. A rotary union and wheel valve apparatus to be utilized in a tire inflation and deflation system on a vehicle with dual tires, comprising:

[A] rotary union means having a fluid inlet and a fluid outlet;

[B] two wheel valves, each comprising:
  [I] a valve body having a fluid inlet passageway and a fluid outlet passageway;
  [II] a bottom chamber in said valve body connecting to said fluid inlet passageway;
  [III] a middle chamber in said valve body separating from said bottom chamber by a flexible diaphragm, connecting to said fluid inlet passageway through an orifice, having:
    (a) a piston movable within said middle chamber, said piston engaging to said diaphragm for movement with said diaphragm;
    (b) a valve seat;
  [IV] a top chamber disposed proximate to said middle chamber, having:
    (a) fluid passageway means connecting to said fluid outlet;
    (b) a poppet sitting on said valve seat and separating the top chamber and the middle chamber, said poppet engaging said piston and movable relative to said piston;
    (c) spring means compressively urging said poppet toward seating disposition;

[C] installation means mounting said rotary union on end of a vehicle axle, mounting said wheel valves on wheel, connecting a fluid source to said rotary union fluid inlet, connecting rotary union fluid inlet to fluid inlets of said wheel valves, and connecting wheel valve fluid outlets to respective tire.

6. An apparatus for adjusting the air pressure in a dual tire mounted on the wheels of a vehicle, comprising:

[A] a source of pressurized air;

[B] a hubcap mounting electronic rotary wheel valve assembly disposed on the axle end of said dual tire for placing each of said dual tire in fluid communication with said assembly, comprising:
  [I] a rotary wheel valve assembly having a rotary union and two wheel valves, each of said wheel valves being pneumatically controllable to open and remaining open for fluid communication, and pneumatically controllable to close for shutting off fluid communication, said wheel valve having electronic circuitry monitoring tire pressure in real time and communicating with an external device;
  [II] hubcap means for having said assembly mounting on the exterior of said hubcap;
  [III] installation means for mounting said hubcap with said assembly on end of a vehicle axle, connecting said air source to said rotary wheel valve air inlet, and connecting said rotary wheel valve air outlets to respective tire;

[C] an electronic control manifold assembly, including:
  [I] a manifold assembly including:
    (a) a housing with an air tight manifold chamber;
    (b) fluid communication means including tubing means for connecting said manifold chamber to said rotary wheel valve assembly;
    (c) valve means, comprising:
      (i) inflation solenoid valve connecting to said manifold chamber and to said air source;
      (ii) deflation solenoid valve connecting to said manifold chamber and to atmosphere through a deflation orifice;
      (iii) quick exhaust valve connecting to said manifold chamber and to atmosphere through a noise reduction muffler;
    (d) priority pressure sensor means monitoring said air source pressure level;
    (e) transducer means monitoring said manifold chamber air pressure level;
    (f) air spring pressure sensor means monitoring air spring pressure level for calculating vehicle load;
  [II] control means receiving pressure data from said priority sensor, wheel valve sensors and manifold chamber transducer, and in response controlling the opening and closing of different valves in said apparatus for adjusting pressure level in said tires.

7. The apparatus of claim 6, further including user interface means, comprising:

[A] a keypad on the electronic manifold assembly for entering user commands and control;

[B] a LCD display on the electronic manifold assembly for showing information and status;

[C] alarm means for warning driver of abnormal tire condition such as a tire blowout.

8. The apparatus of claim 6, further including remote monitoring and control means, comprising:

[A] data communication means, including:
  [I] power line communication means between said apparatus and a cab mounted monitor;
  [II] WiFi communication means between said apparatus and a portable computer or a smartphone with application software;
  [III] CAN bus communication means establishing communication for said electronic manifold assembly with an in-vehicle CAN bus network;

[B] user interface means for monitoring data and entering commands, including:
  [I] cab mounted monitor for vehicle driver;
  [II] handheld monitor for vehicle maintenance personnel.

9. The electronic control manifold assembly of claim 6, further including load sensitive automatic tire pressure adjustment means, comprising:

[A] air spring pressure sensor means measuring vehicle axle air spring pressure variations in real time;

[B] control means receiving said sensor data for determining vehicle load and adjusting tire pressure in accordance to user defined criteria.

10. The tire pressure adjustment means of claim 6, further including manual tire pressure adjustment means, allowing user selection of predetermined tire pressure level based on vehicle load and terrain conditions, including:

[A] load related adjustment means based on selected vehicle load level of full load, half load, or empty load;

[B] terrain related adjustment means based on selected road condition of snow, mud, sand, highway, or cross country driving.

11. An apparatus as defined in claim 6 in which said control means further including system operation means, comprising:
- [A] wheel valve opening procedure means including measuring air source pressure for determining operability of apparatus, closing the normally open quick exhaust valve, measuring air pressure in manifold chamber, opening the inflation valve for a brief time for filling manifold chamber and the connecting rotary wheel valves with sufficiently pressurized air for opening all wheel valves;
- [B] wheel valve shutoff procedure means including opening quick exhaust valve and releasing pressurized air from manifold chamber and air tubes for causing rotary wheel valves to shut off;
- [C] inflation procedure means including opening the inflation value to fill source air to the tires;
- [D] deflation procedure means including opening the deflation value to release air through the deflation orifice while maintaining sufficient air pressure for keep wheel valves open;
- [E] target tire pressure setup procedure means establishing tire pressure set point based on predetermine optimal tire pressure, pressure level with respect to vehicle load or user selection based on terrain condition;
- [F] system adjustment procedure means including conducting target tire pressure setup procedure, conducting wheel valve opening procedure, allowing tires reaching air pressure equalization through the manifold chamber, comparing manifold chamber pressure against desired tire pressure set point, conducting inflation procedure if manifold chamber pressure is lower than set point or conducting deflation procedure if chamber pressure is higher, conducting wheel valve shutoff procedure when target pressure set point is reached;
- [G] start-up operation means for vehicle starting up including conducting a system diagnostics process and conducting said system adjustment procedure;
- [H] dynamic operation means for monitoring and adjusting pressure from all wheel valves when vehicle is on motion, including:
  - [I] monitoring means including collecting real time tire sensor data from wheel valve electronics, detecting high pressure or low pressure tire condition, and determining tire blowout and slow leak and issuing warnings accordingly;
  - [II] high pressure adjustment means including opening wheel valve and releasing air for protecting possibly overheating tires, and opening quick exhaust valve to close all wheel valves when tire pressure coming down to a safe level;
  - [III] low pressure adjustment means including opening wheel valve and inflating air until reaching target set point, and then opening quick exhaust valve to close all wheel valves;
  - [IV] blow out warning means including issuing warnings and not conducting any pressure adjustment procedures;
  - [V] fail-safe operation means periodically checking tire pressure and conducting system adjustment procedure for adjusting tire pressure to the desired level.

12. The electronic control manifold assembly of claim 6, further including means for determining gross and net weights of a vehicle having air springs, comprising:
- [A] air spring pressure sensor means measuring vehicle axle air spring pressure variations;
- [B] vehicle weight calibration means establishing weight calculation criteria with respect to vehicle empty load weight and full load weight.
- [C] vehicle weight calculation means calculating current vehicle gross weight and net weight based on calculation criteria and said air spring pressure sensor readings.

13. An apparatus as defined in claim 6 further including mileage counter, locked wheel detection and overheating tire monitoring functions, comprising:
- [A] a temperature sensor on each wheel valve measuring temperature;
- [B] a magnet installing on a plate affixed to the rotary union shaft for triggering the magnetic sensor in the hubcap mounted wheel valve assembly when the vehicle wheels are rotating;
- [C] wheel rotation count means counting number of wheel rotation based on said magnetic sensor data;
- [D] mileage computing means calculating vehicle distance traveled based on wheel rotation counts and tire size;
- [E] locked wheel detection means determining if any wheel is not rotating in a moving vehicle;
- [F] overheating tire detection means monitoring abnormal tire temperature rising possibly caused by broken bearings, stuck axles or jammed brakes.

* * * * *